United States Patent
Chen et al.

(10) Patent No.: US 12,524,856 B2
(45) Date of Patent: Jan. 13, 2026

(54) IMAGE PROCESSING METHOD AND SYSTEM, AND DEVICE

(71) Applicant: HUAWEI TECHNOLOGIES CO., LTD., Guangdong (CN)

(72) Inventors: Hu Chen, Munich (DE); Quanhe Yu, Beijing (CN); Weiwei Xu, Hangzhou (CN); Jiantong Zhou, Shenzhen (CN); Ruihua Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 285 days.

(21) Appl. No.: 18/494,247

(22) Filed: Oct. 25, 2023

(65) Prior Publication Data

US 2024/0054623 A1     Feb. 15, 2024

Related U.S. Application Data

(63) Continuation of application No. PCT/CN2022/088936, filed on Apr. 25, 2022.

(30) Foreign Application Priority Data

Apr. 30, 2021  (CN) ......................... 202110484386.8
Jul. 9, 2021    (CN) ......................... 202110776612.X

(51) Int. Cl.
G06T 5/92     (2024.01)
G06T 5/40     (2006.01)
(Continued)

(52) U.S. Cl.
CPC .................. G06T 5/92 (2024.01); G06T 5/40 (2013.01); G06T 7/50 (2017.01); H04N 23/86 (2023.01);
(Continued)

(58) Field of Classification Search
CPC ..... G06T 5/92; G06T 5/40; G06T 7/50; G06T 2207/10012; G06T 2207/10024;
(Continued)

(56) References Cited

U.S. PATENT DOCUMENTS 8,606,009 B2 * 12/2013 Sun .......................... G09G 5/10
                                                       345/589
11,528,426 B2 * 12/2022 Cha ......................... G06T 5/70
(Continued)

FOREIGN PATENT DOCUMENTS

| CN | 110225260 A | * | 9/2019 |
| CN | 110602474 A | * | 12/2019 |
| WO | 2021223205 A1 | | 11/2021 |

OTHER PUBLICATIONS

Zhang, Zhuming, et al. "Binocular tone mapping with improved overall contrast and local details." Computer Graphics Forum. vol. 37. No. 7. 2018. (Year: 2018).*
(Continued)

*Primary Examiner* — Andrae S Allison
(74) *Attorney, Agent, or Firm* — WOMBLE BOND DICKINSON (US) LLP

(57) ABSTRACT

This application relates to the field of image processing technologies, and discloses an image processing method and system, and a device, to resolve a problem that tone mapping greatly affects perception of a binocular 3D image. Based on a disparity map of a binocular image, a tone mapping curve is determined for a display device to display an image, instead of being generated merely based on image content. This makes a contrast of a tone mapped binocular image reach at least a level before tone mapping, thereby meeting a minimum disparity variation requirement for 3D perception by human eyes, and improving 3D perception of a 3D image displayed by the display device.

20 Claims, 24 Drawing Sheets

(51) Int. Cl.
*G06T 7/50* (2017.01)
*H04N 23/86* (2023.01)

(52) U.S. Cl.
CPC ............... *G06T 2207/10012* (2013.01); *G06T 2207/10024* (2013.01); *G06T 2207/20208* (2013.01)

(58) Field of Classification Search
CPC . G06T 2207/20208; G06T 2207/10021; G06T 2207/20228; G06T 7/55; G06T 5/90; H04N 23/86; H04N 13/122; H04N 13/15; H04N 13/239; H04N 13/257; H04N 13/271
See application file for complete search history.

(56) References Cited

U.S. PATENT DOCUMENTS

| | | | |
|---|---|---|---|
| 2013/0071019 A1* | 3/2013 | Fukutomi | G06T 5/40 382/167 |
| 2013/0121576 A1* | 5/2013 | Hsu | G06T 5/94 382/167 |
| 2015/0245007 A1* | 8/2015 | Hyodo | H04N 13/122 382/154 |
| 2015/0249791 A1* | 9/2015 | Somanath | H04N 23/90 348/218.1 |
| 2019/0043209 A1* | 2/2019 | Nishimura | H04N 23/60 |
| 2020/0098098 A1* | 3/2020 | Zhang | H04N 9/643 |
| 2020/0195827 A1* | 6/2020 | Wang | H04N 23/71 |
| 2021/0314478 A1* | 10/2021 | Cha | H04N 23/71 |
| 2022/0111839 A1* | 4/2022 | Jiang | G06T 7/593 |

OTHER PUBLICATIONS

Song et al, Visual perception based non-reference binocular tone mapping algorithm, International Conference on Display Technology 2022 (vol. 53, Issue S1) (Year: 2022).*
Lawrence K et al: "Interocular correlation, luminance contrast and cyclopean processing", Dec. 31, 1991, total 13 pages.
Piotr Didyk et al: "A Luminance-Contrast-Aware Disparity Model and Applications", ACM Transactions on Graphics, vol. 31, No. 6, Article 184, Publication Date: Nov. 2012, total 10 pages.
"Recommendation ITU-R BT.1886", Reference electro-optical transfer function for flat panel displays used in HDTV studio production, BT Series Broadcasting service (television), Mar. 2011, total 7 pages.
Thomas Luft et al: "Image Enhancement by Unsharp Masking the Depth Buffer", Jul. 1, 2006, total 8 pages.
Sophie Triantaphillidou et al: "Contrast sensitivity in images of natural scenes", Jul. 2019, total 12 pages.
Minjung Kim et al:"Contrast Sensitivity Functions for HDR Displays",Sep. 29, 2020, total 5 pages.
Nikoletta Bassiou et al: "Color image histogram equalization by absolute discounting back-off", Jul.-Aug. 2007, total 15 pages.
A. Boschetti et al: "High Dynamic Range image tone mapping based on local Histogram Equalization", Jul. 19-23, 2010, total 6 pages.
Karel Zuiderveld: "Contrast Limited Adaptive Histogram Equalization", Aug. 1994, total 12 pages.
Dynamic Metadata for Color Volume Transform—Application #1, SMPTE Standard, SMPTE ST 2094-10:2016, May 18, 2016, total 15 pages.

* cited by examiner

IMAGE PROCESSING METHOD AND SYSTEM, AND DEVICE

CROSS-REFERENCE TO RELATED APPLICATIONS

This application is a continuation of International Application No. PCT/CN2022/088936, filed on Apr. 25, 2022, which claims priority to Chinese Patent Application No. 202110484386.8, filed on Apr. 30, 2021, and Chinese Patent Application No. 202110776612.X, filed on Jul. 9, 2021. All of the aforementioned patent applications are hereby incorporated by reference in their entireties.

TECHNICAL FIELD

Embodiments of this application relate to the field of image processing technologies, and in particular, to an image processing method and system, and a device.

BACKGROUND

A dynamic range (DR) may indicate a ratio of a maximum value to a minimum value of a variable of a picture. A dynamic range of the real world is between $10^{-3}$ and $10^{-6}$, and is referred to as a high dynamic range (HDR). In other words, a brightness value of a thing in the real world may be quite large or quite small. A display capability of a display device is usually limited. Therefore, before the display device displays an image, it is necessary to perform tone mapping on the image to be displayed, to map tones of a high dynamic range image to a display device with a low dynamic range display capability. However, after a binocular 3D image is tone mapped, brightness of the binocular 3D image is reduced, which causes a loss of a global or local contrast of the image and reduces user perception of the displayed binocular 3D image.

SUMMARY

Embodiments of this application provide an image processing method and system, and a device, to resolve a problem that tone mapping greatly affects perception of a binocular three-dimensional (3D) image.

According to a first aspect, an embodiment of this application provides an image processing method, including: obtaining a binocular image, and generating a first tone mapping curve for the binocular image, where the binocular image is a high dynamic range (HDR) image; obtaining a first contrast of the binocular image and a disparity map of the binocular image; obtaining a second contrast of a tone mapped binocular image obtained by performing tone mapping on the binocular image based on the first tone mapping curve; and obtaining a second tone mapping curve based on the first contrast, the second contrast, and the disparity map, where the second tone mapping curve is used to enable a contrast of the tone mapped binocular image to meet a minimum disparity variation requirement for 3D perception by human eyes. According to the foregoing solution, based on the disparity map of the binocular image, a tone mapping curve is determined for a display device to display an image, instead of being generated merely based on image content. This makes a contrast of the tone mapped binocular image reach at least a level before tone mapping, thereby meeting the minimum disparity variation requirement for 3D perception by human eyes, and improving 3D perception of a 3D image displayed by the display device.

In an embodiment, the obtaining a second tone mapping curve based on the first contrast, the second contrast, and the disparity map includes: determining a disparity gradient of a first pixel based on the disparity map, where the first pixel is any pixel in the binocular image; obtaining a gain coefficient of the first pixel based on a first contrast of the first pixel, a second contrast of the first pixel, and the disparity gradient of the first pixel, where the gain coefficient is used to compensate for a reduced contrast of the first pixel caused by tone mapping; and obtaining the second tone mapping curve based on a determined gain coefficient of each pixel in the binocular image. In the foregoing embodiment, the gain coefficient is determined based on the disparity map, the contrast before tone mapping is performed based on the first tone mapping curve, and the contrast after tone mapping is performed based on the first tone mapping curve, to compensate for a reduced contrast of each pixel caused by tone mapping, so that a contrast obtained by tone mapping performed after compensation reaches at least a level before tone mapping.

In an embodiment, the gain coefficient meets the following condition:

$$Q(x, y) = \min\left(\frac{K^{-1}(D'(x, y))}{C_{tm}(x, y)}, \frac{C(x, y)}{C_{tm}(x, y)}\right),$$

where

Q(x,y) represents a gain coefficient of a pixel, x represents a horizontal coordinate of the pixel, y represents a vertical coordinate of the pixel, D'(x,y) represents a disparity gradient of the pixel, $K^{-1}$( ) represents an inverse function of a function describing a relationship between disparity perception sensitivity and a contrast, C(x,y) represents a first contrast of the pixel, and $C_{tm}$(x,y) represents a second contrast of the pixel.

Using the foregoing embodiment to determine the gain coefficient is easy and effective in implementation.

In an embodiment, the function describing a relationship between disparity perception sensitivity and contrast meets the following condition:

$$K(c) = J\frac{3.34c}{c - 1.77},$$

where c represents the contrast, K(c) represents the disparity perception sensitivity, and J represents a fitting coefficient.

In an embodiment, the obtaining the second tone mapping curve based on a gain coefficient includes: obtaining a weighted histogram based on pixel values of pixels included in the binocular image, using a gain coefficient as a weight; and generating the second tone mapping curve based on the weighted histogram.

According to the foregoing embodiment, a tone mapping curve that can compensate for a contrast is generated based on the weighted histogram, to improve 3D perception.

In an embodiment, the obtaining the second tone mapping curve based on a gain coefficient includes: obtaining a weighted histogram based on pixel values of pixels included in the binocular image, using a gain coefficient as a weight; generating a third tone mapping curve based on the weighted histogram; and performing weighting processing on the first tone mapping curve and the third tone mapping curve to obtain the second tone mapping curve. For example, weights of the first tone mapping curve and the second tone mapping curve may be different in different application scenarios. In the foregoing embodiment, the tone mapping curve for compensating for a contrast is obtained by combining two histograms. This implementation is more flexible and applicable to different scenarios.

In an embodiment, the weighted histogram meets the following condition:

$$h_i = \Sigma_{(x,y): l_i \leq I(x,y) < l_{i+1}} Q(x,y) \cdot w(x,y), \text{ where}$$

Q(x,y) represents the gain coefficient of the pixel, w(x,y) represents an adjustment factor of the pixel, I(x,y) represents a pixel value of the pixel, $l_i$ represents an edge of an $i^{th}$ histogram interval, and $h_i$ represents a value of the $i^{th}$ histogram interval of the weighted histogram.

In an embodiment, the obtaining the second tone mapping curve based on a gain coefficient includes:
solving a parameter of the second tone mapping curve based on the gain coefficient in the following manner:

$$\arg\min_{\text{parameter of the second tone mapping curve}} \Sigma_{x,y} \left( \frac{L'_{3D}(I(x,y))}{L'_{2D}(I(x,y))} - Q(x,y) \right)^2,$$

where
$L'_{2D}$ represents a derivative of a first tone mapping curve function, $L'_{3D}$ represents a derivative of a second tone mapping curve function, Q(x,y) represents the gain coefficient of the pixel, and arg min ( ) represents a value of the parameter of the second tone mapping curve when a minimum value is reached in the brackets. By solving the parameter of the mapping curve, the tone mapping curve for compensating for a contrast is obtained based on the gain coefficient, which is simple and effective.

In an embodiment, the obtaining the second tone mapping curve based on a gain coefficient includes:
solving a parameter of a third tone mapping curve based on the gain coefficient in the following manner:

$$\arg\min_{\text{parameter of the second tone mapping curve}} \Sigma_{x,y} \left( \frac{L'_{3D}(I(x,y))}{L'_{2D}(I(x,y))} - Q(x,y) \right)^2,$$

where
$L'_{2D}$ represents a derivative of a first tone mapping curve function, $L'_{3D}$ represents a derivative of a third tone mapping curve function, Q(x,y) represents the gain coefficient of the pixel, and arg min ( ) represents a value of the parameter of the second tone mapping curve when a minimum value is reached in the brackets; and
performing weighting processing on the first tone mapping curve and the third tone mapping curve to obtain the second tone mapping curve.

For example, weights of the first tone mapping curve and the second tone mapping curve may be different in different application scenarios. In the foregoing embodiment, the tone mapping curve for compensating for a contrast is obtained by solving the parameter of the mapping curve. This implementation is more flexible and applicable to different scenarios.

In an embodiment, the obtaining a second contrast of a tone mapped binocular image obtained by performing tone mapping on the binocular image based on the first tone mapping curve includes:
performing tone mapping on the binocular image based on the first tone mapping curve, and obtaining the second contrast of the tone mapped binocular image; or
estimating, based on the first tone mapping curve, a contrast loss value, of the binocular image, existing after tone mapping is performed based on the first tone mapping curve, and obtaining the second contrast based on the contrast loss value and the first contrast.

The foregoing embodiment provides two manners of obtaining the second contrast obtained after tone mapping is performed based on the first tone mapping curve.

In an embodiment, the method further includes: encoding the weighted histogram into dynamic metadata of a bitstream.

In an embodiment, the method further includes: encoding the second tone mapping curve into dynamic metadata of a bitstream.

In an embodiment, the method further includes: performing tone mapping on the binocular image by using the second tone mapping curve.

According to a second aspect, an embodiment of this application provides an image processing apparatus, including:
an obtaining module, configured to: obtain a binocular image, and generate a first tone mapping curve for the binocular image, where the binocular image is a high dynamic range HDR image;
a first determining module, configured to obtain a first contrast of the binocular image and a disparity map of the binocular image;
a second determining module, configured to obtain a second contrast of a tone mapped binocular image obtained by performing tone mapping on the binocular image based on the first tone mapping curve; and
a third determining module, configured to obtain a second tone mapping curve based on the first contrast, the second contrast, and the disparity map, where
the second tone mapping curve is used to enable a contrast of the tone mapped binocular image to meet a minimum disparity variation requirement for 3D perception by human eyes.

In an embodiment, the third determining module is configured to: determine a disparity gradient of a first pixel based on the disparity map, where the first pixel is any pixel in the binocular image; obtain a gain coefficient of the first pixel based on a first contrast of the first pixel, a second contrast of the first pixel, and the disparity gradient of the first pixel, where the gain coefficient is used to compensate for a reduced contrast of the first pixel caused by tone mapping; and obtain the second tone mapping curve based on a determined gain coefficient of each pixel in the binocular image.

In an embodiment, the gain coefficient meets the following condition:

$$Q(x,y) = \min\left( \frac{K^{-1}(D'(x,y))}{C_{tm}(x,y)}, \frac{C(x,y)}{C_{tm}(x,y)} \right).$$

where
Q(x,y) represents a gain coefficient of a pixel, x represents a horizontal coordinate of the pixel, y represents a vertical coordinate of the pixel, D'(x,y) represents a disparity gradient of the pixel, $K^{-1}(\ )$ represents an inverse function of a function describing a relationship between disparity perception sensitivity and a contrast, C(x,y) represents a first contrast of the pixel, and $C_{tm}$(x,y) represents a second contrast of the pixel.

In an embodiment, the function describing a relationship between disparity perception sensitivity and contrast meets the following condition:

$$K(c) = J\frac{3.34c}{c - 1.77},$$

where
c represents the contrast, K(c) represents the disparity perception sensitivity, and J represents a fitting coefficient.

In an embodiment, when obtaining the second tone mapping curve based on the gain coefficient, the third determining module is configured to: obtain a weighted histogram based on pixel values of pixels included in the binocular image, using a gain coefficient as a weight; and generate the second tone mapping curve based on the weighted histogram.

In an embodiment, when obtaining the second tone mapping curve based on the gain coefficient, the third determining module is configured to: obtain a weighted histogram based on pixel values of pixels included in the binocular image, using a gain coefficient as a weight; generate a third tone mapping curve based on the weighted histogram; and perform weighting processing on the first tone mapping curve and the third tone mapping curve to obtain the second tone mapping curve.

In an embodiment, the weighted histogram meets the following condition:

$$h_i = \Sigma_{(x,y): l_i \leq I(x,y) < l_{i+1}} Q(x,y) \cdot w(x,y), \text{ where}$$

Q(x,y) represents the gain coefficient of the pixel, w(x,y) represents an adjustment factor of the pixel, I(x,y) represents a pixel value of the pixel, $l_i$ represents an edge of an $i^{th}$ histogram interval, and $h_i$ represents a value of the $i^{th}$ histogram interval of the weighted histogram.

In an embodiment, when obtaining the second tone mapping curve based on the gain coefficient, the third determining module is configured to: solve a parameter of the second tone mapping curve based on the gain coefficient in the following manner:

$$\arg\min_{parameter\ of\ the\ second\ tone\ mapping\ curve} \Sigma_{x,y} \left(\frac{L'_{3D}(I(x, y))}{L'_{2D}(I(x, y))} - Q(x, y)\right)^2,$$

where
$L'_{2D}$ represents a derivative of a first tone mapping curve function, $L'_{3D}$ represents a derivative of a second tone mapping curve function, Q(x,y) represents the gain coefficient of the pixel, and arg min ( ) represents a value of the parameter of the second tone mapping curve when a minimum value is reached in the brackets.

In an embodiment, when obtaining the second tone mapping curve based on the gain coefficient, the third determining module is configured to: solve a parameter of a third tone mapping curve based on the gain coefficient in the following manner:

$$\arg\min_{parameter\ of\ the\ second\ tone\ mapping\ curve} \Sigma_{x,y} \left(\frac{L'_{3D}(I(x, y))}{L'_{2D}(I(x, y))} - Q(x, y)\right)^2,$$

where
$L'_{2D}$ represents a derivative of a first tone mapping curve function, $L'_{3D}$ represents a derivative of a third tone mapping curve function, Q(x,y) represents the gain coefficient of the pixel, and arg min ( ) represents a value of the parameter of the second tone mapping curve when a minimum value is reached in the brackets; and perform weighting processing on the first tone mapping curve and the third tone mapping curve to obtain the second tone mapping curve.

In an embodiment, the second determining module is configured to: perform tone mapping on the binocular image based on the first tone mapping curve, and obtain the second contrast of the tone mapped binocular image; or estimate, based on the first tone mapping curve, a contrast loss value, of the binocular image, existing after tone mapping is performed based on the first tone mapping curve, and obtain the second contrast based on the contrast loss value and the first contrast.

In an embodiment, the apparatus further includes an encoding module, configured to encode the weighted histogram into dynamic metadata of a bitstream.

In an embodiment, the apparatus further includes an encoding module, configured to encode the second tone mapping curve into dynamic metadata of a bitstream.

In an embodiment, the apparatus further includes a tone mapping module, configured to perform tone mapping on the binocular image by using the second tone mapping curve.

According to a third aspect, an embodiment of this application provides an encoder, configured to implement the method according to the first aspect. It should be noted that the encoder does not perform tone mapping on a binocular image by using a second tone mapping curve. For example, the encoder may include the apparatus according to any embodiment of the second aspect, but does not include a tone mapping module.

According to a fourth aspect, an embodiment of this application provides an encoding device, including a non-volatile memory and a processor that are coupled to each other. The processor invokes program code stored in the memory, to perform the method according to any one of the first aspect or the embodiments of the first aspect. It should be noted that the processor does not perform tone mapping on a binocular image based on a second tone mapping curve.

According to a fifth aspect, an embodiment of this application provides a decoder, configured to implement the method according to the first aspect. It should be noted that the decoder does not perform an operation of encoding a weighted histogram into a bitstream or encoding a second tone mapping curve into a bitstream. For example, the encoder may include the apparatus according to any embodiment of the second aspect, but does not include an encoding module.

According to a sixth aspect, an embodiment of this application provides an encoding device, including a non-volatile memory and a processor that are coupled to each other. The processor invokes program code stored in the memory, to perform the method according to any one of the first aspect or the embodiments of the first aspect. It should be noted that the processor does not perform an encoding operation, for example, an operation of encoding a weighted histogram into a bitstream or encoding a second tone mapping curve into a bitstream.

According to a seventh aspect, an embodiment of this application provides an image processing system, including the encoder according to the third aspect and the decoder according to the fifth aspect, or including the encoding device according to the fourth aspect or the decoding device according to the sixth aspect.

According to an eighth aspect, an embodiment of this application provides a computer-readable storage medium. The computer-readable storage medium stores program code. The program code includes instructions used to perform some or all of operations of any method in the first aspect.

According to a ninth aspect, an embodiment of this application provides a computer program product. When the computer program product runs on a computer, the computer is enabled to perform some or all of operations of any method in the first aspect.

It should be understood that for beneficial effects of the second aspect to the ninth aspect of this application, refer to related descriptions of the first aspect. Details are not described again.

DESCRIPTION OF EMBODIMENTS

Figure 1:
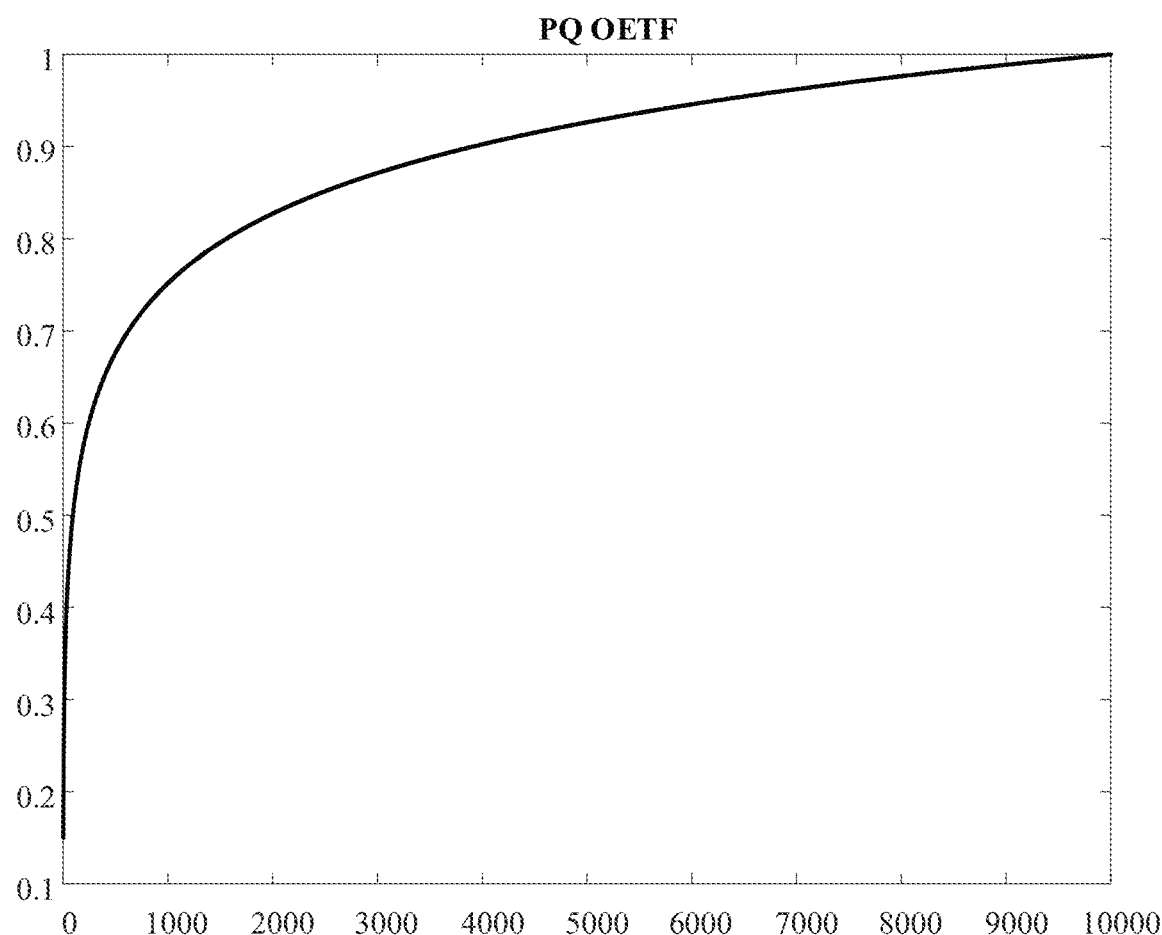
FIG. 1 is a schematic diagram of a PQ optical-electro transfer function relationship.

In this specification, embodiments, claims, and accompanying drawings of this application, the terms "first", "second", and the like are intended to distinguish between similar objects but do not necessarily indicate a specific order or sequence. In addition, terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in this application, "at least one (item)" refers to one or more and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. A character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

A dynamic range refers to a ratio of a maximum grayscale value to a minimum grayscale value in a displayable range of an image. Currently, in most color digital images, each of channels R, G, and B is stored by using one byte, that is, 8 bits. To be specific, when a representation range of each channel is grayscale levels from 0 to 255, a dynamic range of an image is 0 to 255. However, a dynamic range in a same scene in the real world is within a range from $10^{-3}$ and $10^{-6}$, and the range is referred to as a high dynamic range (HDR for short). Compared with the high dynamic range, a dynamic range for a common picture is referred to as a low dynamic range (LDR). Therefore, it may be understood that an imaging process of a digital camera is actually a mapping process from a high dynamic range for the real world to a low dynamic range for a photo.

A larger dynamic range of an image indicates more scene details and richer light levels that are shown by the image and more vivid visual effect.

In an optical digital imaging process (for example, an imaging process of a digital camera), optical radiation in a real scene is converted into an electrical signal through an image sensor, and the electrical signal is stored in a form of a digital image. Image display aims to reproduce, through a display device, a real scene described by a digital image. An ultimate objective of the optical digital imaging process and the image display is to enable a user to obtain visual perception the same as that obtained when the user directly observes the real scene. Luminance levels that can be presented by optical radiation (optical signals) for the real scene are almost linear. Therefore, the optical signal is also referred to as a linear signal. However, in a process of converting an optical signal into an electrical signal in optical digital imaging, not every optical signal corresponds to one electrical signal. In addition, an electrical signal obtained through conversion is nonlinear. Therefore, the electrical signal is also referred to as a nonlinear signal. A curve for converting an optical signal into an electrical signal is an optical-electro transfer function (OETF). The optical-electro transfer functions in embodiments of this application include a perceptual quantizer (PQ) optical-electro transfer function, a hybrid log-gamma (HLG) optical-electro transfer function, and a scene luminance fidelity (SLF) optical-electro transfer function.

The PQ optical-electro transfer function is a perceptual quantizer optical-electro transfer function provided based on a luminance perception model for human eyes. The PQ optical-electro transfer function indicates a conversion relationship between a linear signal value of an image pixel and a nonlinear signal value in a PQ domain. FIG. 1 is a schematic diagram of a PQ optical-electro transfer function relationship. The PQ optical-electro transfer function may be expressed as formula (1-1):

$$\begin{cases} R' = \text{PQ\_TF}(\max(0, \min(R/10000, 1))) \\ G' = \text{PQ\_TF}(\max(0, \min(G/10000, 1))) \\ B' = \text{PQ\_TF}(\max(0, \min(B/10000, 1))) \end{cases} \quad (1\text{-}1)$$

Parameters in formula (1) are obtained through calculation in the following manner:

$$L' = \text{PQ\_TF}(L) = \left(\frac{c_1 + c_2 L^{m_1}}{1 + c_3 L^{m_1}}\right)^{m_2},$$

where

L represents a linear signal value, and the value is normalized to [0, 1].

L' represents a nonlinear signal value, and a range of the value is [0, 1].

$$m_1 = \frac{2610}{4096} \times \frac{1}{4} = 0.1593017578\ 125,$$

where $m_1$ is a PQ optical-electro transfer coefficient.

$$m_2 = \frac{2523}{4096} \times 128 = 78.84375,$$

where $m_2$ is a PQ optical-electro transfer coefficient.

$$c_1 = c_3 - c_2 + 1 = \frac{3424}{4096} = 0.8359375,$$

where $c_1$ is a PQ optical-electro transfer coefficient.

$$c_2 = \frac{2413}{4096} \times 32 = 18.8515625,$$

where $c_2$ is a PQ optical-electro transfer coefficient.

$$c_3 = \frac{2392}{4096} \times 32 = 18.6875,$$

where $c_3$ is a PQ optical-electro transfer coefficient.

Figure 2:
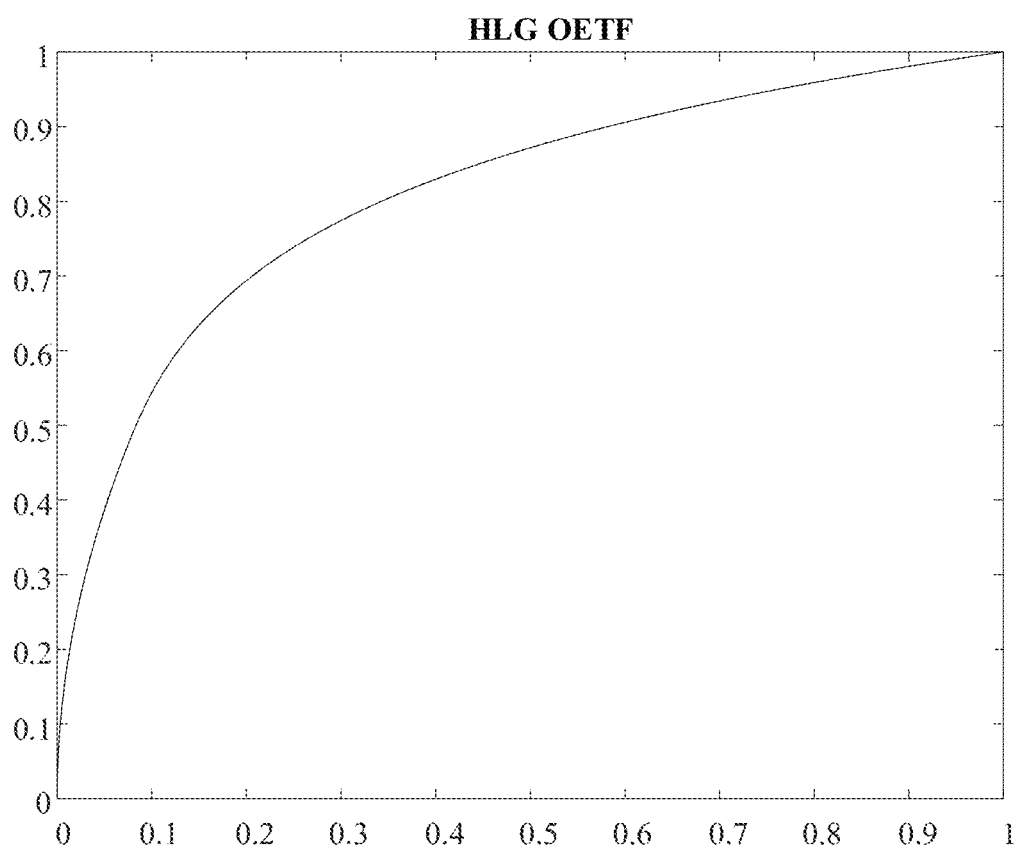
FIG. 2 is a schematic diagram of an HLG optical-electro transfer function relationship.

The HLG optical-electro transfer function is obtained by improving a conventional gamma curve. For the HLG optical-electro transfer function, the conventional gamma curve is used in the lower half region, and a log curve is added to the upper half region. FIG. 2 is a schematic diagram of an HLG optical-electro transfer function relationship. The HLG optical-electro transfer function indicates a conversion relationship between a linear signal value of an image pixel and a nonlinear signal value in an HLG domain. The HLG optical-electro transfer function may be expressed as formula (1-2):

$$L' = \text{HLG\_TF}(L) = \begin{cases} \sqrt{L}/2, 0 \le L \le 1 \\ a\ln(L-b) + c, 1 < L \end{cases}, \quad (1\text{-}2)$$

where

L represents a linear signal value, and a range of the value is [0, 12]. L' represents a nonlinear signal value, and a range of the value is [0, 1]; a=0.17883277, representing an HLG optical-electro transfer coefficient; b=0.28466892, representing an HLG optical-electro transfer coefficient; and c=0.55991073, representing an HLG optical-electro transfer coefficient.

Figure 3:
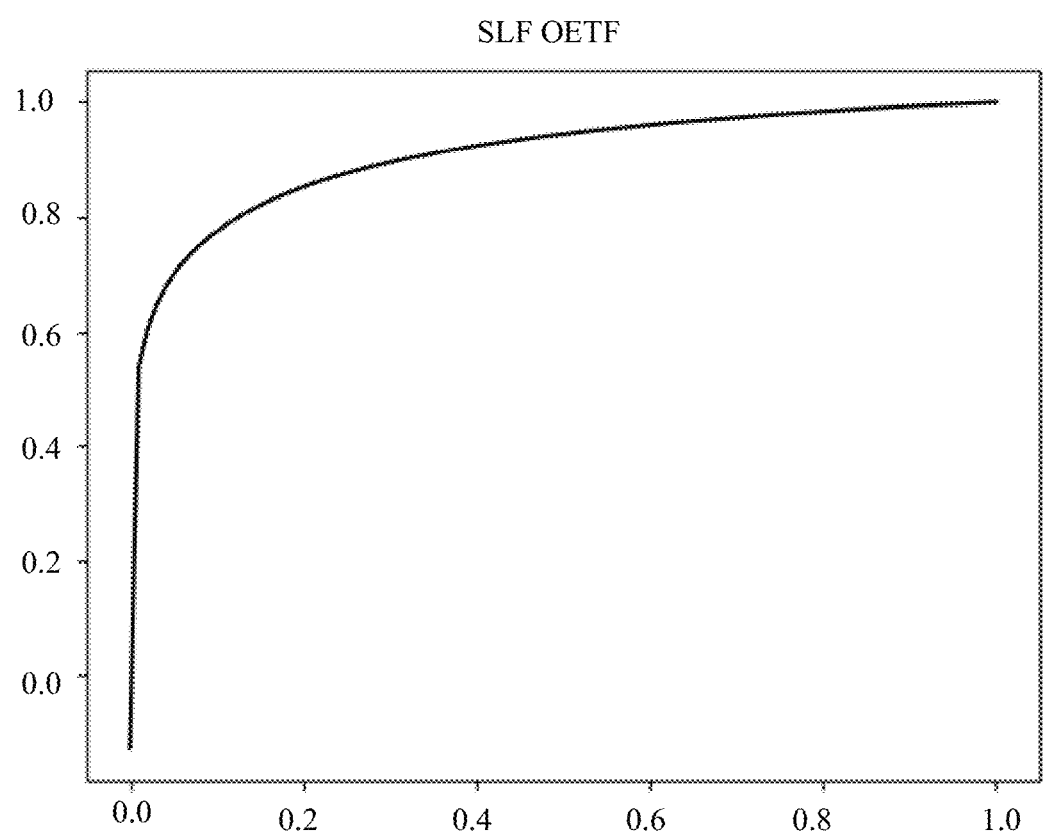
FIG. 3 is a schematic diagram of an SLF optical-electro transfer function relationship.

The SLF optical-electro transfer function is an optimal curve obtained based on luminance distribution in an HDR scene when optical characteristics of human eyes are met. FIG. 3 is a schematic diagram of an SLF optical-electro transfer function relationship.

An SLF optical-electro transfer curve indicates a conversion relationship between a linear signal value of an image pixel and a nonlinear signal value in an SLF domain. The conversion relationship between the linear signal value of an image pixel and the nonlinear signal value in the SLF domain is expressed as formula (1-3):

$$\begin{cases} R' = \text{SLF\_TF}(\max(0, \min(R/10000, 1))) \\ G' = \text{SLF\_TF}(\max(0, \min(G/10000, 1))) \\ B' = \text{SLF\_TF}(\max(0, \min(B/10000, 1))) \end{cases} \quad (1\text{-}3)$$

The SLF optical-electro transfer function may be expressed as formula (1-4):

$$L' = \text{SLF\_TF}(L) = a \times \left(\frac{p \times L}{(p-1) \times L + 1}\right)^m + b, \quad (1\text{-}4)$$

where
L represents a linear signal value, and the value is normalized to [0, 1]; L' represents a nonlinear signal value, and a range of the value is [0, 1]; p=2.3, representing an SLF optical-electro transfer coefficient; m=0.14, representing an SLF optical-electro transfer coefficient; a=1.12762, representing an SLF optical-electro transfer coefficient; and b=−0.12762, representing an SLF optical-electro transfer coefficient.

A principle of binocular stereoscopic (3D) vision is as follows: As a person's two eyes are spaced apart, images obtained by the left and right eyes are different. A human visual system combines the images obtained by the left and right eyes and creates a perception of depth with a difference between the two images.

A disparity map is used to describe a correspondence between characteristics of images obtained by left and right eyes, or a correspondence between mapping points of a same spatial physical point in different images. There are two image formats in binocular stereoscopic vision. One format is a binocular image format. To be specific, a binocular camera simultaneously shoots a same scene from left and right viewpoints. In the binocular image format, a disparity map may be derived by using a disparity estimation algorithm. Another format is a monocular image plus a depth map. The depth map is used to describe a distance between each pixel in the monocular image and an observer. Images from the left and right viewpoints may be obtained through calculation using the monocular image and the depth map. In an example, the depth map may be converted into a disparity map, and a relationship is: disparity=pupillary distance×focal length/depth.

A voxel in embodiments of this application is a concept created to express the case that a pixel of two-dimensional (2D) space is extended to three-dimensional space. Voxel is similar to a minimum unit of two-dimensional space, that is, pixel. A two-dimensional image includes pixels, and a three-dimensional image includes voxels. Voxel is a minimum unit of a three-dimensional (3D) image. It should be noted that the voxel does not include an absolute coordinate position, but depth information may be extracted from a relative position of the voxel.

A 3D mesh (Polygon mesh) in embodiments of this application is a set of vertices and polygons that represent a shape of a polyhedron in three-dimensional computer graphics. For example, an object surface may be divided into a plurality of triangular areas, and each area has a set of parameters to control rendering. The 3D mesh includes three-dimensional information of space. Depth information may also be extracted from the 3D mesh.

A 3D point cloud refers to a set of points obtained by using a 3D scanner. Each point includes three-dimensional coordinates, and may further be associated with other features, such as a color component (R, G, B) or an object surface reflection coefficient. The point cloud includes three-dimensional coordinates, and a depth map corresponding to the point cloud may be directly deduced based on the three-dimensional coordinates.

Figure 4A:
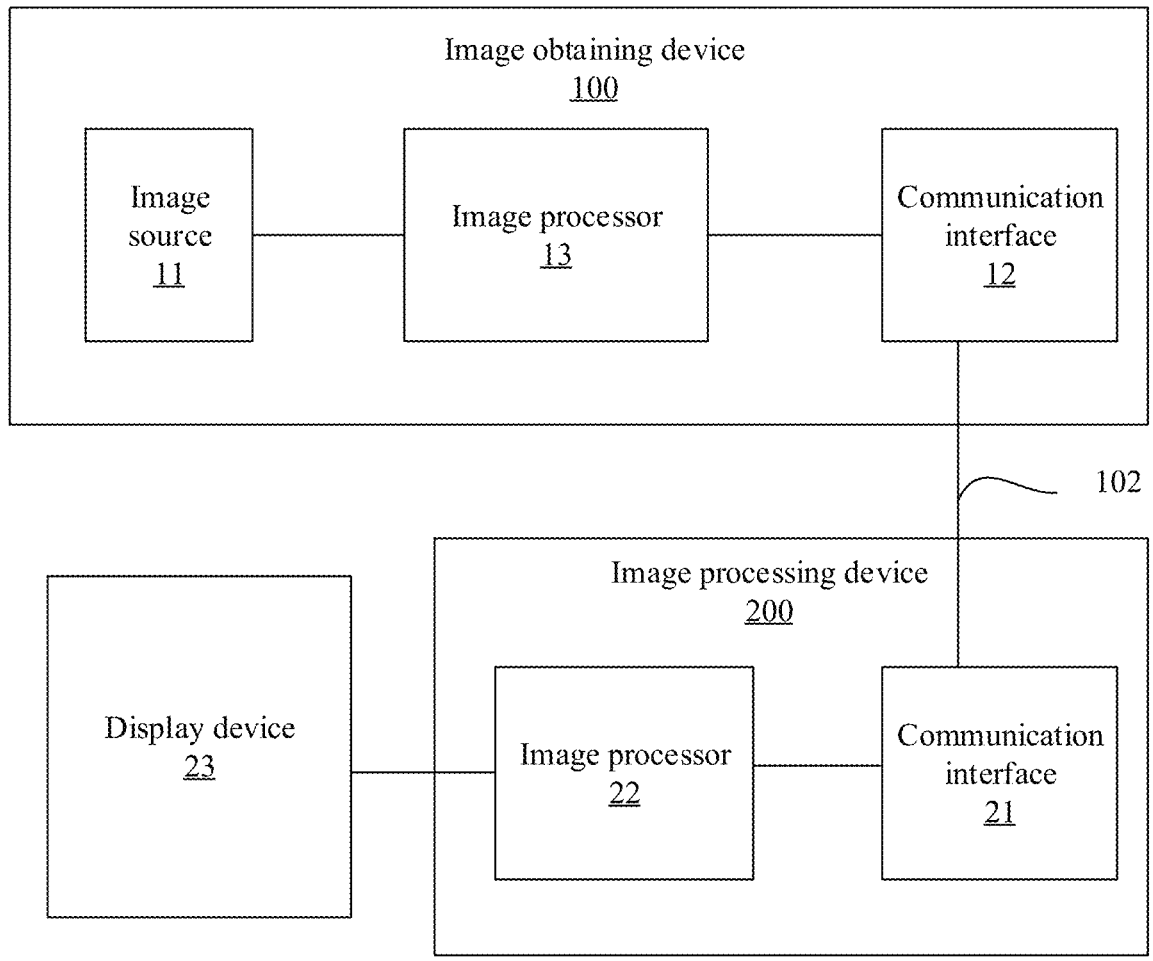
FIG. 4A is a schematic block diagram of an image display system according to an embodiment of this application.

FIG. 4A is a schematic block diagram of an example image display system according to an embodiment of this application. The image display system may include an image obtaining device 100 and an image processing device 200. For example, the image obtaining device 100 may obtain a binocular 3D image. The binocular 3D image may be an HDR image or a standard dynamic range (SDR) image. The image processing device 200 may process the binocular 3D image obtained by the image obtaining device 100.

The image obtaining device 100 and the image processing device 200 may be communicatively connected through a link 102. The image processing device 200 may receive image data from the image obtaining device 100 through the link 102. The link 102 may include one or more communication media or apparatuses. The one or more communication media may include a wireless and/or wired communication medium, for example, a radio frequency (RF) spectrum or one or more physical transmission lines. Optionally, the one or more communication media may be a part of a packet-based network, and the packet-based network is, for example, a local area network, a wide area network, or a global network (for example, the Internet). The one or more communication media may include a router, a switch, a base station, or any other device that facilitates communication from the image obtaining device 100 to the image processing device 200. In an optional case, the link 102 may be a Bluetooth wireless link.

For example, the image obtaining device 100 includes an image source 11 and a communication interface 12. The communication interface 12 may also be referred to as a transmission interface. In addition, optionally, the image obtaining device 100 may further include an image processor 13. In terms of specific implementation forms, the image processor 13, the picture source 11, and the communication interface 12 may be hardware components in the image obtaining device 100, or may be software programs in the image obtaining device 100, or the communication interface 12 may be a combination of a hardware module and a software program.

The picture source 11 may include or be any type of picture capture device configured to, for example, capture a picture from the real world; and/or any type of device for generating a picture or comment (for screen content encoding, some text on a screen is also considered as a part of a to-be-encoded picture or image), for example, a computer graphics processor configured to generate a computer animation picture; or any type of device for obtaining and/or providing a picture from the real world or a computer animation picture (for example, screen content or a virtual reality (VR) picture); and/or any combination thereof (for example, an augmented reality (AR) picture). For example, the picture source 11 may be a camera configured to capture a picture or a memory configured to store a picture. The picture source 11 may further include any type of (internal or external) interface through which a previously captured or generated picture is stored and/or a picture is obtained or received. When the picture source 11 is a camera, the picture source 11 may be, for example, a local camera or a camera integrated into the image obtaining device. When the picture source 11 is a memory, the picture source 11 may be, for example, a local memory or a memory integrated into the image obtaining device. When the picture source 11 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server.

A picture may be considered as a two-dimensional array or matrix of pixels. A pixel in the array may also be referred to as a sample. In an optional case, each pixel includes three color components to represent a color. For example, in an RGB format or color space, the picture includes corresponding red, green, and blue sample arrays. However, in video coding, each pixel is usually represented in a luminance/chrominance format or color space. For example, a picture in a YUV format includes a luminance component indicated by Y (or sometimes L) and two chrominance components indicated by U and V. The luminance (luma) component Y represents luminance or gray level intensity (for example, both are the same in a gray-scale picture), and the two chrominance (chroma) components U and V represent chrominance or color information components. Correspondingly, a picture in the YUV format includes a luminance sample array of luminance sample values (Y) and two chrominance sample arrays of chrominance values (U and V). A picture in an RGB format may be transformed or converted into a YUV format and vice versa. This process is also referred to as color conversion or color format conversion. If a picture is monochrome, the picture may include only a luminance sample array. In this embodiment of this application, a picture transmitted by the picture source 11 to the image processor may also be referred to as raw picture data.

The image processor 13 is configured to perform image processing, for example, luminance mapping, tone mapping, color format conversion (for example, conversion from an RGB format to a YUV format), color gamut conversion, saturation adjustment, color grading, resolution adjustment, or noise reduction.

The communication interface 12 may be configured to: receive picture data on which image processing is performed, and transmit, through the link 102, the picture data on which image processing is performed to the image processing device 200 for further image processing, or transmit the picture data to a memory for storage. For example, the communication interface 12 may be configured to encapsulate the picture data on which image processing is performed into data in a proper format, for example, a data packet, for transmission over the link 102.

The image processing device 200 includes a communication interface 21, an image processor 22, and a display device 23. They are separately described as follows.

The communication interface 21 may be configured to receive, from the image obtaining device 100 or any other source, picture data on which image processing is performed, where the any other source is, for example, a storage device. For example, for specific examples of the communication interface 12 and the communication interface 21, refer to the foregoing descriptions of the interfaces. Details are not described herein again. The communication interface 21 may be configured to transmit or receive, through the link 102 between the image obtaining device 100 and the image processing device 200 or any other type of network, picture data on which image processing is performed. The communication interface 21 may be, for example, configured to decapsulate the data packet transmitted by the communication interface 12, to obtain the picture data on which image processing is performed.

Both the communication interface 21 and the communication interface 12 may be configured as unidirectional communication interfaces or bidirectional communication interfaces, and may be configured to, for example, send and receive messages to establish a connection, and acknowledge and exchange any other information related to a communication link and/or data transmission, for example, transmission of picture data on which image processing is performed. For example, each of the communication interface 21 and the communication interface 12 may be any type of interface according to any dedicated or standard interface protocol, for example, a high-definition multimedia interface (HDMI), a mobile industry processor interface (MIPI), an MIPI-standardized display serial interface (DSI), a video electronics standards association (VESA)-standardized embedded display port (eDP), a Display Port (DP) or a V-by-One interface, where the V-by-One interface is a digital interface standard developed for image transmission, or any wired or wireless interface or optical interface.

The image processor 22 is configured to perform tone mapping on the picture data on which image processing is performed, to obtain tone mapped picture data. The image processor 22 may further perform super-resolution, color format conversion (for example, conversion from a YUV format to an RGB format), noise reduction, color gamut conversion, saturation adjustment, brightness mapping, upsampling, downsampling, image sharpening, and other processing, and may further be configured to transmit the tone mapped picture data to the display device 23. It should be understood that the image processor 13 and the image processor 22 may be general-purpose central processing units (CPU), systems on chip (SOC), processors integrated on an SOC, independent processor chips, controllers, or the like. The image processor 22 and the image processor 13 may alternatively be dedicated processing devices, for example, application-specific integrated circuits (ASIC), field programmable gate arrays (FPGA) or digital signal processors (DSP), dedicated video or graphics processors, graphics processing units (GPU), and neural-network processing units (NPU). The image processor 13 and the image processor 22 may alternatively be a processor group including a plurality of processors, and the plurality of processors are coupled to each other through one or more buses.

The display device 23 is configured to receive the tone mapped picture data, to display a picture to a user or a viewer. The display device 23 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or other displays of any type. In an optional case, the display device 23 has an image processing function, so that tone mapping of an image may alternatively be implemented on the display device.

It should be understood that, in FIG. 4A, the image obtaining device 100, the image processing device 200, and the display device 23 are shown as independent devices. In an optional case, an image processing apparatus may have functions of both the image obtaining device 100 and the image processing device 200. In an optional case, an image processing apparatus may have functions of both the image processing device 200 and the display device 23. In an optional case, an image processing apparatus has functions of the image obtaining device 100, the image processing device 200, and the display device 23. For example, a smart mobile phone has a camera, an image processor, and a display. The camera corresponds to the image obtaining device 100, the image processor corresponds to the image processing device 200, and the display corresponds to the display device 23. For another example, a smart television has a camera, an image processor, and a display. The camera corresponds to the image obtaining device 100, the image processor corresponds to the image processing device 200, and the display corresponds to the display device 23.

In a possible scenario, the image obtaining device 100 needs to transmit a video stream including a plurality of consecutive images to the image processing device. Before transmitting the video stream to the image processing device 200, the image obtaining device 100 may encode the images in the video stream into a bitstream and transmit the bitstream to the image processing device 200 through the link 102. In this scenario, after receiving the encoded bitstream, the image processing device 200 decodes the bitstream to obtain the images in the video stream, and further processes the images. In an example, in this scenario, the image obtaining device 100 may be referred to as an encoder or an encoding device, and the image processing device 200 may be referred to as a decoder or a decoding device.

In an optional case, the image processing device includes a hardware layer, an operating system layer running above the hardware layer, and an application layer running above the operating system layer. The hardware layer includes hardware such as a CPU, a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not particularly limited in embodiments of this application, provided that related code can be run to implement the method provided in embodiments of this application to perform image processing. For example, the execution body of the method provided in embodiments of this application may be an electronic device, or a functional module that can invoke and execute a program in an electronic device, for example, may be a processor in an electronic device.

It should be understood that the image obtaining device 100 and the image processing device 200 may include any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming transmission device (for example, a content service server or a content delivery server), a broadcast receiver device, or a broadcast transmitter device, and may use or not use any type of operating system.

The image obtaining device may capture, by receiving an optical signal from a natural scene, a picture or a video including the natural scene. To facilitate image or video transmission, the optical signal needs to be converted into an electrical signal, and image information of each pixel is recorded by using a luminance value or chrominance value (for example, a grayscale value between 0 and 255) whose value range is fixed. The display device may determine, based on an optical-electro transfer function and the luminance value or the grayscale value of each pixel in the image, luminance of an object during photographing, that is, the electronic device may convert YUV or RGB information into luminance measured in nit. In an optional case, the image obtaining device is referred to as a front-end device, and the display device is referred to as a back-end device. However, luminance of an object may exceed a display capability of the display device. Because luminance information obtained by the image obtaining device does not match a luminance display capability of the display device, there are a case in which a display device with a low luminance display capability is used to display a high luminance image and a case in which a display device with a high luminance display capability is used to display a low luminance image. For example, the front-end device collects a light signal of 4000 nits, but an HDR display capability of the back-end display device (a television set, a tablet, or the like) is only 1000 nits. In these cases, tone mapping (tone mapping) needs to be performed on an image obtained by the image obtaining device, so that the image meets the display capability of the display device. For example, tones of a high dynamic range image may be mapped, by using a tone mapping curve, to a display device with a low dynamic range display capability. It should be noted that the tone mapping curve may be determined by the display device or may be determined by a processing device located outside the display device.

A tone mapping method may include a static mapping method and a dynamic mapping method. The static mapping method is a process of performing overall tone mapping, based on a single piece of data, content in a same video or content in a same hard disk. In other words, processing curves for all data or content are generally the same. The static mapping method carries less information, and a processing procedure is simple. However, a same curve is used for tone mapping in each scene, which may cause information loss in some scenes. For example, if the curve focuses on a bright region, some details are lost in some dark scenes. In extreme cases, the dark scenes cannot be displayed after tone mapping. In the dynamic mapping method, dynamic adjustment is performed based on content in a specific area, content in each scene, or content of each frame. The dynamic mapping method has a better effect than the static mapping method.

When tone mapping is performed on a binocular 3D image, luminance of the binocular 3D image is reduced, which causes a global or local contrast loss of the image. However, only when a contrast is strong enough, a visual system of the left and right eyes combines two images obtained by the left and right eyes. As a result, after tone mapping is performed on the binocular 3D image, user's perception of the displayed binocular 3D image is affected due to the global or local contrast loss of the image.

Figure 4B:
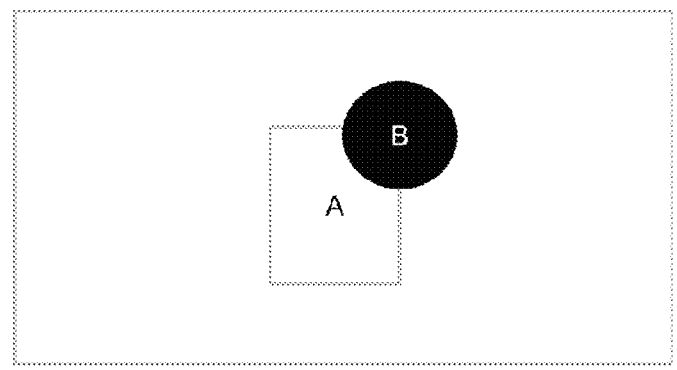
FIG. 4B is a schematic diagram of an object contrast according to an embodiment of this application.

As shown in FIG. 4B, generally, after tone mapping is performed on a binocular image, brightness of the image is reduced, which causes a global or local contrast loss of the image. The contrast loss means a degraded 3D perception effect. Through research, the applicant finds that the contrast and the 3D perception effect are associated with disparity information of the binocular image. For example, as shown in FIG. 4B, it is assumed that an object A and an object B are far away from each other, but both the two objects are far away from the background. In this case, during binocular 3D display, it is easy for human eyes to identify a depth between the background and the object A, and a depth between the background and the object B. Even if a contrast of a binocular 3D image is reduced through tone mapping, human eyes can still easily perceive depths between the object A and the object B and the background within a range, thereby obtaining perception of a 3D effect. If depths of A and B are quite close, contrast reduction matters to 3D perception. After tone mapping, human eyes may not identify a depth difference between the object A and the object B, and may even mistakenly consider that A and B are a same object. Based on this, to better perceive the object A and the object B, contrasts of the object A and the object B need to be protected to reduce impact of tone mapping on the contrasts of the object A and the object B.

Based on this, embodiments of this application provide an image processing method and apparatus, to reduce degradation of a 3D effect caused by a contrast reduction by adjusting dynamic mapping. In a tone mapping process of a binocular 3D image, a contrast of an image source and disparity information of the image source are used in combination, so that a 3D perception effect of a tone mapped image is infinitely close to a 3D perception effect of the image source, or it may be understood that a contrast of a tone mapped binocular image meets a disparity requirement, or in other words, meets a 3D perception requirement of a user.

Figure 5:
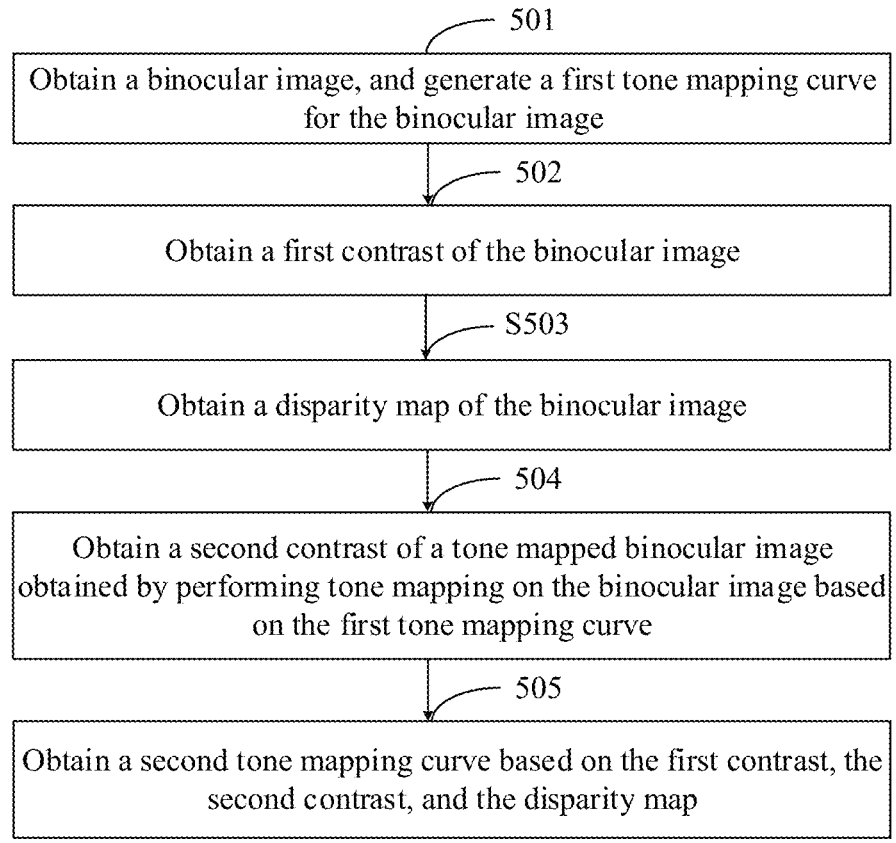
FIG. 5 is a schematic flowchart of an image processing method according to an embodiment of this application.

FIG. 5 is a schematic flowchart of an image processing method according to an embodiment of this application. The method shown in FIG. 5 may be performed by one or more processors for tone mapping. The one or more processors may include an image processor in the image processing device 200 shown in FIG. 4A, and/or an image processor in the image obtaining device 100 shown in FIG. 4A. In other words, the method shown in FIG. 5 is implemented at an encoder side or a decoder side, or is jointly implemented at an encoder side or a decoder side.

In operation 501, a binocular image is obtained, and a first tone mapping curve is generated for the binocular image. The binocular image is an HDR image.

In an embodiment of this application, two different tone mapping curves are used, and are respectively referred to as a first tone mapping curve and a second tone mapping curve for ease of differentiation. The binocular image may be understood as one 2D image that is obtained by combining two 2D images. Then, a tone mapping curve is obtained through calculation based on content of the 2D image. In an embodiment of this application, the tone mapping curve generated based on the content of the 2D image is referred to as the first tone mapping curve, or may be referred to as an image-based tone mapping curve or a tone mapping curve for a 2D image. Certainly, another name may be used. This is not limited in this application. According to the solution provided in this application, a tone mapping curve generated based on a depth or a disparity map of an image is referred to as the second tone mapping curve in this embodiment of this application, or may be referred to as a disparity-based tone mapping curve or a tone mapping curve for 3D image.

In this embodiment of this application, during generation of the first tone mapping curve, any manner of generating a tone mapping curve based on image content may be used. This is not limited in this embodiment of this application.

In operation 502, a first contrast of the binocular image is obtained.

A manner of obtaining a contrast of an image is not limited in this application. In an example, the following describes a possible manner of obtaining a contrast of an image.

A local root mean square (RMS) contrast in an M×M window with each pixel (x,y) as a center is calculated according to the following formula (2-1):

$$C_{RMS}(x, y) = \sqrt{\frac{1}{M \times M} \sum_{-M<i<M, -M<j<M} \frac{(I(x+i, y+j) - \bar{I}(x,y))^2}{\bar{I}(x,y)^2}}, \quad (2\text{-}1)$$

where $C_{RMS}(x,y)$ represents a local root mean square contrast of the pixel (x,y), $\bar{I}(x,y)$ represents an average value of pixel values of all pixels in the M×M window with the pixel (x,y) as a center, I(x,y) represents a pixel value of the pixel (x,y), (x,y) represents coordinates of the pixel, x represents a horizontal coordinate, and y represents a vertical coordinate. The pixel value of the pixel may be one of red, green, and blue (RGB) components, or a value of max(R, G, B), that is, the largest value of R, G, and B components on each pixel, or luminance Y (Y in YCbCr), or another value.

Further, an image signal is decomposed at different spatial frequencies to obtain image signals in different spatial frequency bands. For each pixel, a frequency corresponding to a maximum pixel value after decomposition is obtained, and the frequency is used as a primary frequency f(x,y) of the pixel. For example, a cosine (e.g., Cosine log) filter may be used to decompose an image signal at different spatial frequencies.

Further, a contrast of each pixel is obtained based on a local root mean square contrast of each pixel and a contrast sensitivity function (CSF). The CSF is related to a spatial frequency and luminance, and is used to represent sensitivity of human eyes to the spatial frequency.

For example, the contrast of each pixel may be obtained according to the following formula (2-2):

$$C(x,y) = C_{RMS}(x,y) \cdot \text{CSF}(\bar{I}(x,y), f(x,y)) \quad (2\text{-}2),$$

where

C(x,y) represents the contrast of each pixel.

In operation 503, a disparity map of the binocular image is obtained.

In an embodiment of this application, a manner of obtaining the disparity map by performing disparity estimation on the binocular image is not limited. In an example, the obtained disparity map may be shown in unit of arc second (arcsec).

A disparity map D(x,y) of each pixel represents a quantity of pixels of a distance in a disparity direction between a pixel I1(x,y) in one image in the binocular image and a corresponding pixel I2(x+D(x,y),y) at a same pixel position in the other image.

It should be noted that operation 503 and operation 502 are not subject to a specific sequence in this embodiment of this application. For example, operation 503 may be performed before operation 502, or performed after operation 502, or operation 502 and operation 503 may be performed at the same time.

In operation 504, a second contrast of a tone mapped binocular image is obtained by performing tone mapping on the binocular image based on the first tone mapping curve.

In some embodiments, the first tone mapping curve may be used to perform tone mapping on the binocular image, and then a contrast is calculated for the tone mapped binocular image to obtain the second contrast. During calculation of the contrast for the tone mapped binocular image, a calculation manner the same as that of the first contrast may be used. Alternatively, a different calculation manner may be used. This is not limited in this embodiment of this application.

In some other embodiments, a contrast loss value may be estimated based on the first tone mapping curve, and then the second contrast existing after tone mapping is estimated based on the first contrast and the contrast loss value.

In an example, the contrast loss value may be estimated based on a function derivative of the first tone mapping curve. A physical meaning of the derivative is a slope of the curve at a pixel value L. The slope is usually less than 1, indicating the reduction or loss of the contrast. Certainly, the slope may alternatively be equal to 1, and the contrast remains unchanged. Certainly, the contrast may be enhanced. In this case, the slope is greater than 1, that is, the contrast is enhanced at the pixel value L.

Further, the second contrast may be estimated according to the following formula (2-3):

$$\overline{C}_{tm}(x,y) = C(x,y) \cdot L'_{2D}(I(x,y)) \tag{2-3},$$

where

C(x,y) represents a first contrast of the pixel (x,y), $\overline{C}_{tm}(x,y)$ represents an estimated second contrast of the pixel (x,y), $L'_{2D}(I(x,y))$ represents the function derivative of the first tone mapping curve, $L_{2D}(L)$ represents a function of the first tone mapping curve, and I(x,y) represents a pixel value of the pixel (x,y).

In operation 505, the second tone mapping curve is obtained based on the first contrast, the second contrast, and the disparity map.

The second tone mapping curve is used to enable a contrast of the tone mapped binocular image to meet a minimum disparity variation requirement of 3D perception by human eyes.

In an embodiment, during obtaining of the second tone mapping curve based on the first contrast, the second contrast, and the disparity map, a gain coefficient used to compensate for a contrast may be calculated by using the first contrast, the second contrast, and the disparity map. Then, the second tone mapping curve that can implement contrast compensation is obtained by using the gain coefficient.

Figure 6:
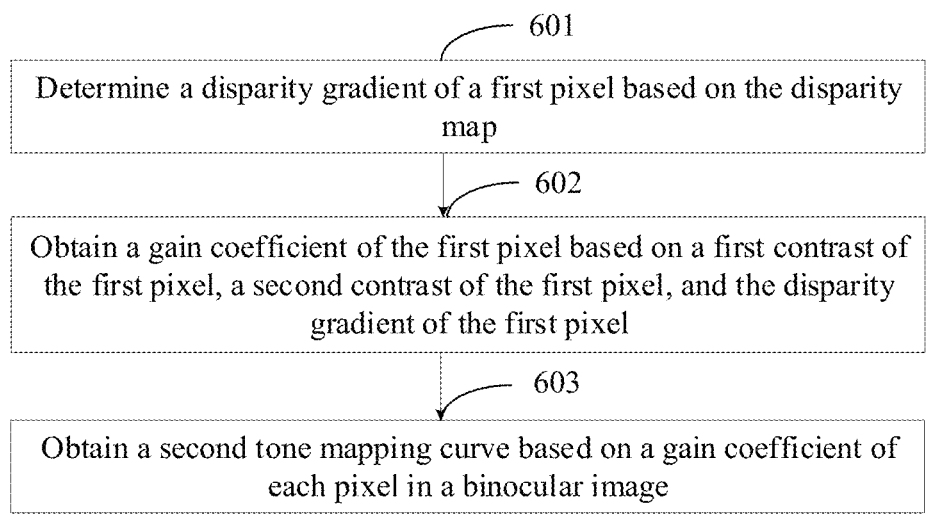
FIG. 6 is a schematic flowchart of obtaining a second tone mapping curve according to an embodiment of this application.

For example, referring to FIG. 6, operation 505 of obtaining the second tone mapping curve based on the first contrast, the second contrast, and the disparity map may be implemented by using the following operations 601 to 603.

In operation 601, a disparity gradient of a first pixel is determined based on the disparity map. The first pixel is any pixel in the binocular image.

In an example, D(x,y) is used to represent a disparity map of the pixel (x,y). In this case, the pixel (x,y) may be determined according to the following formula (2-4):

$$D'(x, y) = \frac{\sqrt{(D(x+1, y) - D(x-1, y))^2 + (D(x, y+1) - D(x, y-1))^2}}{4} \tag{2-4}$$

In operation 602, a gain coefficient of the first pixel is obtained based on a first contrast of the first pixel, a second contrast of the first pixel, and the disparity gradient of the first pixel. The gain coefficient is used to compensate for a reduced contrast of the first pixel caused by tone mapping.

In an example, during obtaining of the gain coefficient based on the first contrast, the second contrast, and the disparity gradient, the gain coefficient may be determined according to the following formula (2-5):

$$Q(x, y) = \min\left(\frac{K^{-1}(D'(x, y))}{C_{tm}(x, y)}, \frac{C(x, y)}{C_{tm}(x, y)}\right), \tag{2-5}$$

where

Q(x,y) represents a gain coefficient of a pixel, x represents a horizontal coordinate of the pixel, y represents a vertical coordinate of the pixel, D'(x,y) represents a disparity gradient of the pixel, C(x,y) represents a first contrast of the pixel, $C_{tm}(x,y)$ represents a second contrast of the pixel, K( ) represents a function describing a relationship between disparity perception sensitivity and a contrast and $K^{-1}$( ) represents an inverse function of the function describing a relationship between disparity perception sensitivity and a contrast. The disparity perception sensitivity may be understood as a degree of sensitivity of human eyes to a disparity variation, or may be understood as a minimum disparity threshold for human eyes to perceive a disparity variation when a contrast of an image is given.

In an example, the function describing a relationship K( ) between disparity perception sensitivity and contrast may be obtained by fitting test data of binocular 3D disparity perception, for example, by fitting test data of binocular 3D disparity perception of Cormack, to obtain K( ). For example, K( ) after fitting is shown in formula (2-6).

$$K(c) = J\frac{3.34c}{c - 1.77}, \tag{2-6}$$

where c represents the contrast, K(c) represents the disparity perception sensitivity, and J represents a fitting coefficient. In an example, when the test data of the binocular 3D disparity perception of Cormack is used for fitting, a value of J is 1.

It may be understood that a smaller value of the contrast c indicates a larger value of K(c). Generally, after tone mapping is performed on an image, a contrast is reduced, a perception threshold of a disparity variation becomes larger, and a 3D perception effect is weakened in some regions with a small disparity variation or a region with a small depth variation. To compensate for a disparity variation caused by a contrast variation caused by tone mapping, a gain coefficient of each pixel may be calculated by using K(c), the first contrast before tone mapping, and the second contrast after tone mapping, for example, as shown in formula (2-5). The gain coefficient is used to increase the contrast after tone mapping to a disparity perception minimum threshold, that is, $K^{-1}(D'(x,y))$. In this way, human eyes can perceive a 3D effect. In some scenes, if a contrast of an image source is less than the threshold, the solution provided in this application can improve the contrast to the contrast level of the image source, so that the contrast after tone mapping basically does not decrease, and a 3D perception effect similar to that of the image source can be achieved.

In operation 603, the second tone mapping curve is obtained based on the gain coefficient of each pixel in the binocular image.

It should be noted that the solution provided in this embodiment of this application may be applicable to obtaining a local tone mapping curve, or may be applicable to obtaining a global tone mapping curve. This is not limited in this application.

In an embodiment, during execution of operation 603 of obtaining the second tone mapping curve based on the gain coefficient of each pixel in the binocular image, any one of the following possible manners may be used.

In a first possible manner, the second tone mapping curve may be generated by using a histogram equalization method. During histogram calculation, a gain coefficient may be used as a weight to obtain a weighted histogram, so that the second tone mapping curve is generated based on the weighted histogram by using the histogram equalization method.

In an example, the weighted histogram may meet a condition shown in the following formula (2-7):

$$h_i = \Sigma_{(x,y): l_i \leq I(x,y) < l_{i+1}} Q(x,y) \cdot w(x,y) \quad (2\text{-}7)$$

where

Q(x,y) represents the gain coefficient of the pixel, I(x,y) represents a pixel value of the pixel, $l_i$ represents a left edge of $i^{th}$ histogram interval in the weighted histogram, and $h_i$ represents a value of the $i^{th}$ histogram interval in the weighted histogram.

The foregoing w(x,y) represents an adjustment factor of the pixel, and w(x,y) may be determined based on a requirement. For example, a weight of an edge pixel in the binocular image may be increased to improve a contrast. Alternatively, different values of w(x,y) are used for different user groups. For example, some user groups are less sensitive to 3D perception than common user groups. In this case, a weight can be increased through w(x,y) to improve a contrast. For example, the value of w(x,y) may be 1.

In some embodiments, $l_i$ may be determined in a manner shown in the following formula (2-8):

$$l_i = l_{min} + i/N l_{max} \quad (2\text{-}8)$$

where i=0, . . . , N, $l_{min}$ represents a minimum value of pixel values in the binocular image, $l_{max}$ represents a maximum value of the pixel values in the binocular image, and N represents a quantity of histogram intervals obtained by dividing value ranges of the pixel values in the binocular image.

In some other embodiments, $l_i$ may be determined in a manner shown in the following formula (2-9):

$$l_i = i/N \quad (2\text{-}9)$$

In this embodiment, normalization may be first performed on the pixel values of pixels in the binocular image, to normalize value ranges of the pixels included in the binocular image to intervals from 0 to 1, and then the weighted histogram is calculated in the foregoing provided manner.

It should be noted that, this application is also applicable to local tone mapping processing. The binocular image may be divided into different regions, a weighted histogram is calculated for each region, and then a tone mapping curve corresponding to each region is generated by using a local histogram equalization method.

In a second possible manner, the second tone mapping curve may be generated by using the histogram equalization method. During histogram calculation, a gain coefficient may be used as a weight to obtain a weighted histogram, so that a third tone mapping curve is generated based on the weighted histogram by using the histogram equalization method. Then, weighting processing is performed on the first tone mapping curve and the third tone mapping curve to obtain the second tone mapping curve. For example, the first tone mapping curve and the third tone mapping curve may be fused through weighted averaging on the two tone mapping curves to obtain the second tone mapping curve. Certainly, weights of the two tone mapping curves may also be separately determined based on a requirement.

It should be noted that, in some scenarios, a capability of a display device to display a binocular 3D image is limited. In this case, a weight of the first tone mapping curve may be configured to be larger, and a weight of the third tone mapping curve may be configured to be smaller. For example, the weight of the first tone mapping curve may be 1, and the weight of the third tone mapping curve is 0. In some other scenarios, when a 3D perception effect needs to be enhanced, the weight of the third tone mapping curve may be configured to be larger, and the weight of the first tone mapping curve may be configured to be smaller. For example, the weight of the third tone mapping curve is 1, and the weight of the first tone mapping curve is 0.

During calculation of the weighted histogram, the manner described in the first possible manner may be used. Details are not described herein again.

It should be noted that, this application is also applicable to local tone mapping processing. The binocular image may be divided into different regions, a weighted histogram is calculated for each region, and then a tone mapping curve corresponding to each region is generated by using the local histogram equalization method.

In a third possible manner, the tone mapping curve may not be generated in the histogram equalization method. A gain coefficient may be applied to calculation of a function of the second tone mapping curve. For example, the gain coefficient may be applied to solving a parameter of the second tone mapping curve.

In an example, the parameter of the second tone mapping curve is solved based on the gain coefficient through the following formula (2-10):

$$\arg\min_{\text{parameter of the second tone mapping curve}} \sum_{x,y} \left( \frac{L'_{3D}(I(x,y))}{L'_{2D}(I(x,y))} - Q(x,y) \right)^2, \quad (2\text{-}10)$$

where $L'_{2D}$ represents a derivative of a first tone mapping curve function, $L'_{3D}$ represents a derivative of a second tone mapping curve function, Q(x,y) represents the gain coefficient of the pixel, and arg min ( ) represents a value of the parameter of the second tone mapping curve when a minimum value is reached in the brackets.

For example, the tone mapping curve is a curve defined in the SMPTE ST 2094-10 standard. For example, the first tone mapping curve is represented according to the following formula (2-11):

$$L_{2D}(L) = \left( \frac{\overline{c_1} + \overline{c_2} \times L^{\overline{n}}}{1 + \overline{c_3} \times L^{\overline{n}}} \right), \quad (2\text{-}11)$$

where
L represents an input pixel value before tone mapping is performed based on the first tone mapping curve, $\overline{c_1}$, $\overline{c_2}$, and $\overline{n}$ represent adjustment parameters of the first tone mapping curve, and $\overline{c_1}$, $\overline{c_2}$, and $\overline{n}$ in the first tone mapping curve may be obtained through calculation based on content of the binocular image.

It is assumed that the second tone mapping curve is represented according to the following formula (2-12):

$$L_{3D}(L) = \left(\frac{c_1 + c_2 \times L^n}{1 + c_3 \times L^n}\right), \quad (2\text{-}12)$$

where
L represents an input pixel value before tone mapping is performed by using the second tone mapping curve, and $c_1$, $c_2$, and n represent adjustment parameters of the second tone mapping curve.

Values of $c_1$, $c_2$, and n are obtained by solving an optimization problem according to the foregoing formula (2-10), and a specific calculation process is shown in the following formula:

$$\arg\min_{c1,c2,c3,n} \sum_{x,y} \left(\frac{L'_{3D}(I(x,y))}{L'_{2D}(I(x,y))} - Q(x,y)\right)^2.$$

In a fourth possible manner, weighted fusion may also be performed based on the first tone mapping curve and a tone mapping curve obtained based on the gain coefficient, to obtain the second tone mapping curve. During obtaining of the tone mapping curve based on the gain coefficient, the manner shown in the foregoing formula (2-10) may be used.

The solutions provided in embodiments of this application are described below in detail with reference to specific application scenarios.

In a first possible scenario, an encoder side determines a weighted histogram and transmits the weighted histogram to a decoder side, and the decoder side determines a second tone mapping curve based on the weighted histogram. For example, the encoder side may be an image obtaining device, and the decoder side may be an image processing device.

Figure 7A:
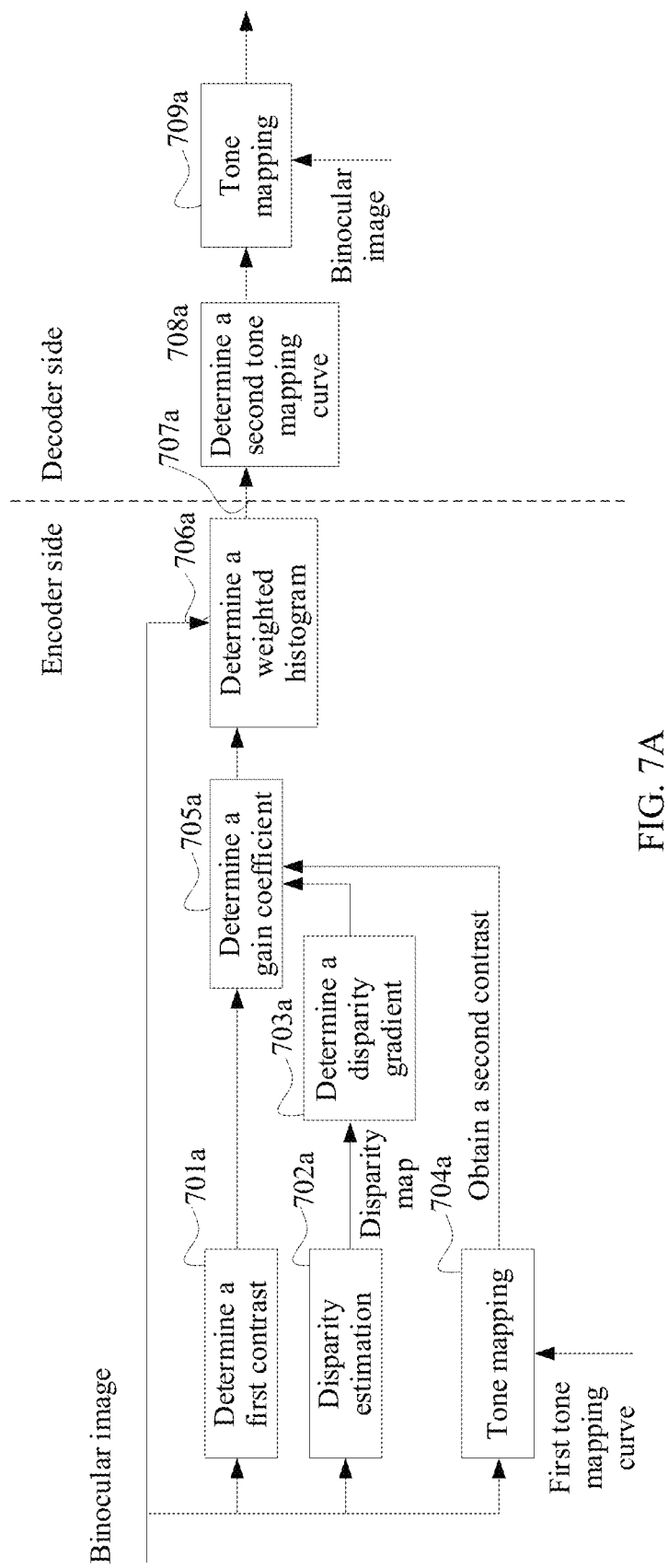
FIG. 7A is a schematic diagram of an image processing procedure provided in Example 1 according to an embodiment of this application.
Figure 7B:
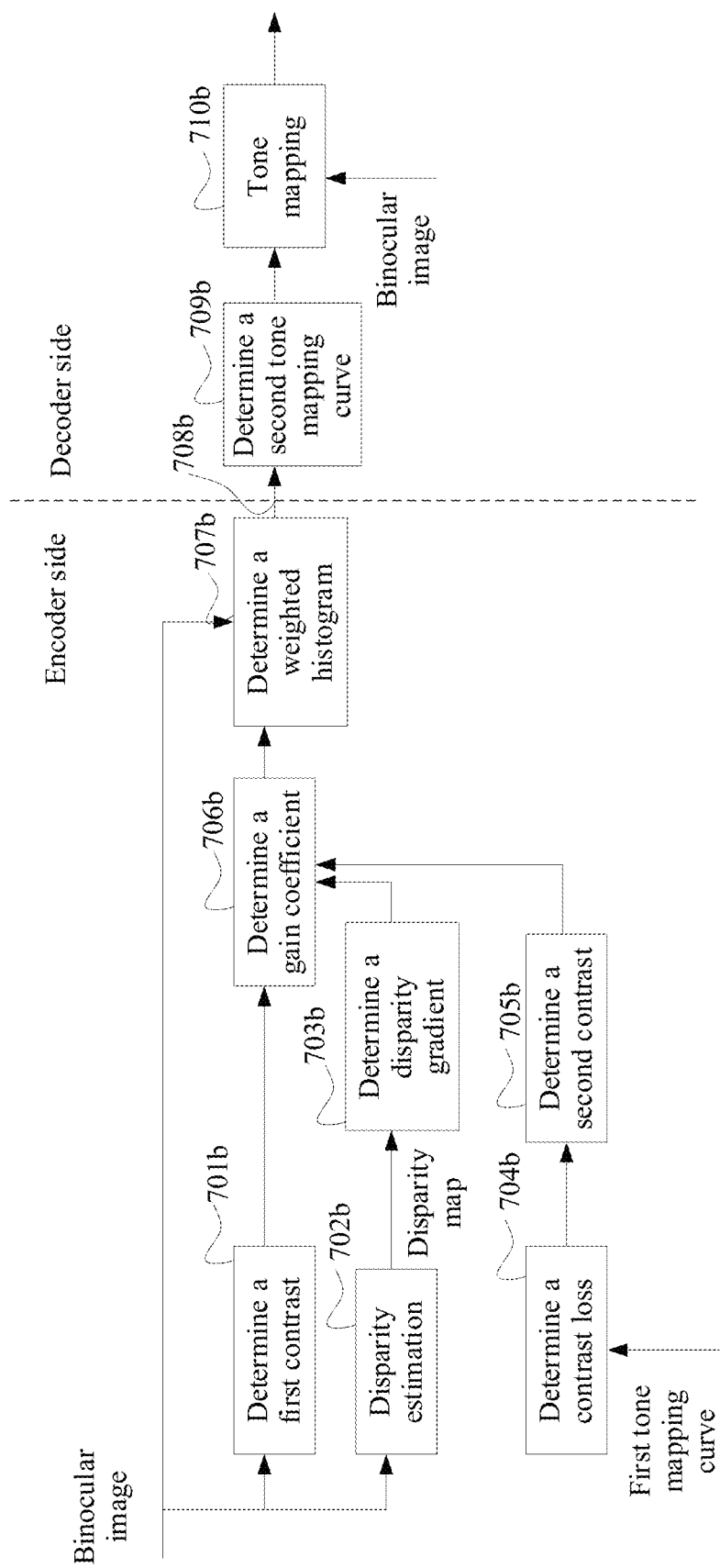
FIG. 7B is a schematic diagram of another image processing procedure provided in Example 1 according to an embodiment of this application.

Example 1: The first possible implementation is used to obtain a second tone mapping curve. Refer to FIG. 7A and FIG. 7B. FIG. 7A is a schematic diagram of a possible image processing procedure.

In operation 701a, the encoder side obtains a first contrast of each pixel in a binocular image. For details, refer to the related descriptions of operation 502. Details are not described herein again.

The binocular image may be any video frame of image in a video stream.

In operation 702a, the encoder side performs disparity estimation on the binocular image to obtain a disparity map of each pixel in the binocular image. For details, refer to the related descriptions of operation 503. Details are not described herein again.

In operation 703a, the encoder side determines a disparity gradient of each pixel based on the disparity map. For example, for a manner of determining the disparity gradient, refer to the related descriptions of operation 601. Details are not described herein again.

In operation 704a, the encoder side performs tone mapping on the binocular image by using a first tone mapping curve, and obtains a second contrast of each pixel in a tone mapped binocular image. For details, refer to the related descriptions of operation 504. Details are not described herein again.

In operation 705a, the encoder side obtains a gain coefficient of each pixel based on the first contrast, the second contrast, and the disparity gradient of each pixel. For details, refer to the related descriptions of operation 602. Details are not described herein again.

In operation 706a, the encoder side obtains a weighted histogram of the binocular image by using the gain coefficient of each pixel as a weight.

In operation 707a, the encoder side encodes the weighted histogram into a bitstream, and sends the bitstream to the decoder side. For example, the weighted histogram may be encoded into dynamic metadata of the bitstream.

The bitstream may include binocular image data and metadata used to describe the binocular image data. Both the metadata and the binocular image data are encoded into the bitstream. The metadata includes descriptions of the binocular image data. For example, the metadata may include static metadata, and may further include dynamic metadata. The static metadata may be used to describe a production environment of an entire video, for example, may include related information of a monitor used for color grading and correction in video production, peak luminance, RGB tri-color coordinates, white point coordinates, or the like. For example, the dynamic metadata generally includes content descriptions of the binocular image, for example, descriptions of highest luminance, lowest luminance, and average luminance of the binocular image.

In an embodiment of this application, the weighted histogram may be added to the dynamic metadata, to generate a tone mapping curve for the binocular image and a display device. It should be understood that the bitstream may include data of a plurality of consecutive binocular images, and the weighted histogram included in the dynamic metadata may vary with a change of the binocular images in the bitstream.

In operation 708a, the decoder side obtains a second tone mapping curve for the binocular image based on the weighted histogram.

For example, the second tone mapping curve may be generated based on the weighted histogram by using a histogram equalization method. For details, refer to the related descriptions in the first possible manner. Details are not described herein again.

For example, the decoder side may decode the bitstream to obtain data of the binocular image and the weighted histogram of the binocular image from the dynamic metadata, and then further generate the second tone mapping curve based on the weighted histogram.

In operation 709a, the decoder side performs tone mapping on the binocular image by using the second tone mapping curve, and outputs a tone mapped binocular image.

In an example, the decoder side may further perform other processing on the binocular image before tone mapping, or perform other processing on the tone mapped binocular image after tone mapping and before the output. This is not limited in this embodiment of this application.

FIG. 7B is a schematic diagram of another possible image processing procedure.

For operations 701b to 703b, refer to operations 701a to 703a. Details are not described herein again.

In operation 704b, the encoder side estimates, based on the first tone mapping curve, a contrast loss value, of each pixel in the binocular image, existing after mapping is performed based on the first tone mapping curve. For details, refer to the related descriptions of operation 504. Details are not described herein again.

In operation 705*b*, the encoder side estimates, based on the contrast loss value of each pixel, a second contrast of the tone mapped binocular image obtained by performed mapping on the binocular image based on the first tone mapping curve.

For operations 706*b* to 710*b*, refer to operations 706*a* to 709*a*. Details are not described herein again.

Figure 8A:
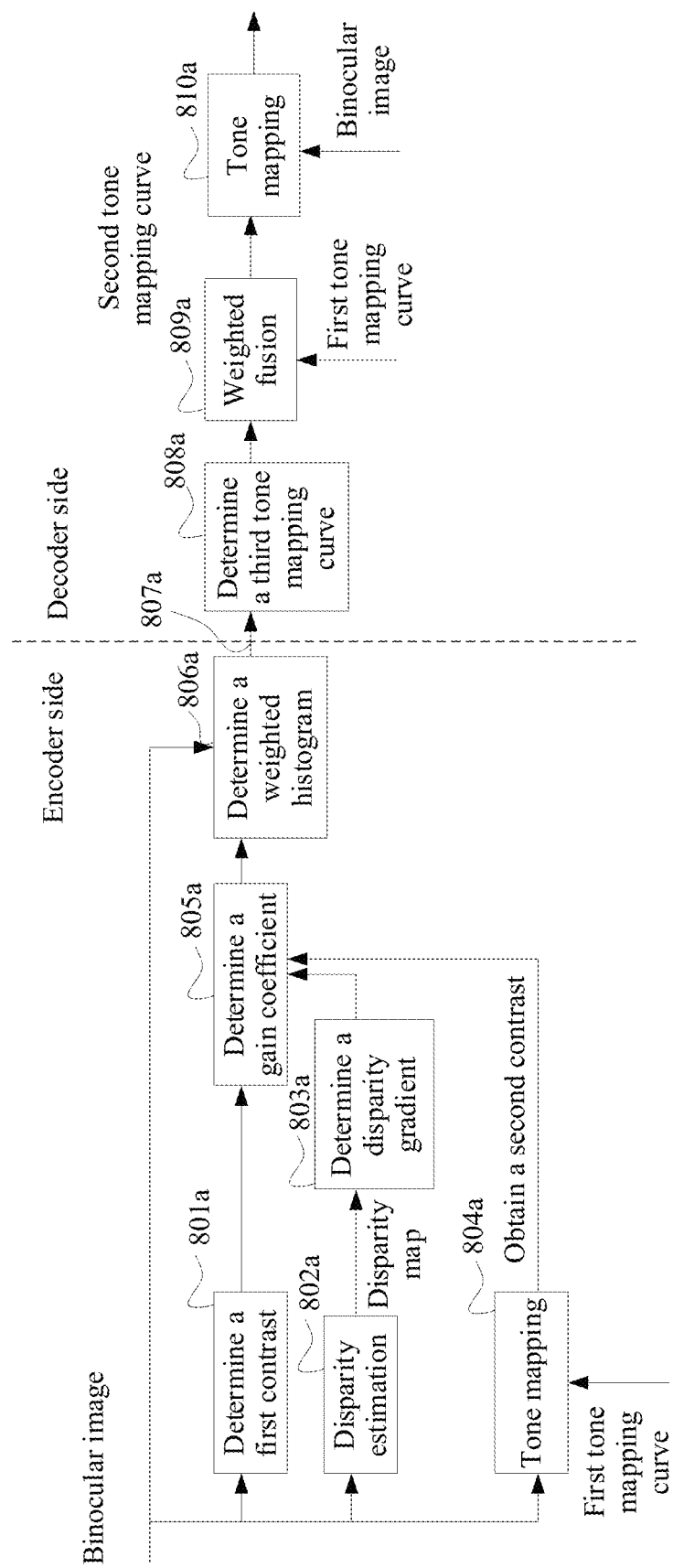
FIG. 8A is a schematic diagram of an image processing procedure provided in Example 2 according to an embodiment of this application.
Figure 8B:
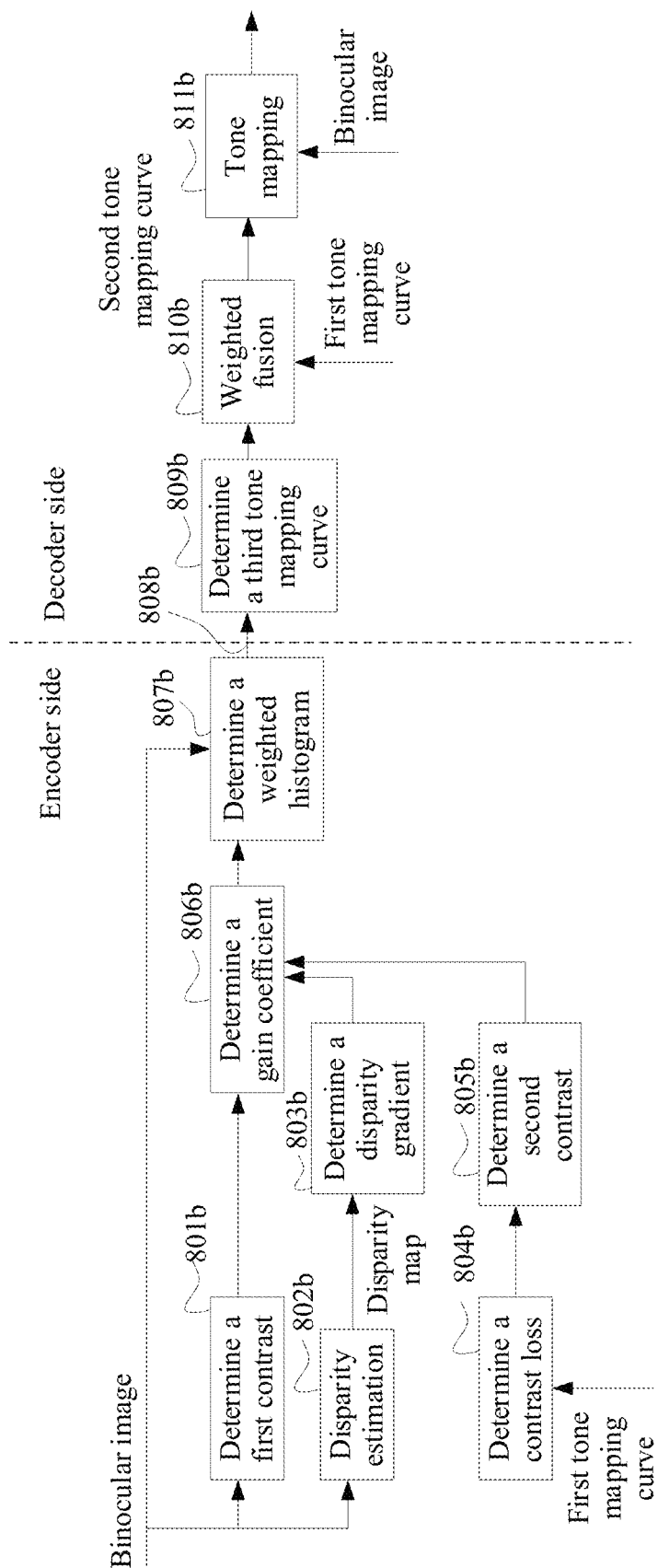
FIG. 8B is a schematic diagram of another image processing procedure provided in Example 2 according to an embodiment of this application.

Example 2: The second possible implementation is used to obtain a second tone mapping curve. Refer to FIG. 8A and FIG. 8B. FIG. 8A is a schematic diagram of a possible image processing procedure.

For operations 801*a* to 807*a*, refer to operations 701*a* to 707*a*. Details are not described herein again.

In some embodiments, the encoder may further encode a parameter of the first tone mapping curve into a bitstream.

In operation 808*a*, the decoder side obtains a third tone mapping curve for a binocular image based on a weighted histogram.

In operation 809*a*, the decoder side performs weighted fusion on the first tone mapping curve and the third tone mapping curve to obtain a second tone mapping curve.

In some embodiments, the decoder side may decode the bitstream to obtain the parameter of the first tone mapping curve, to generate the first tone mapping curve. In some other embodiments, the decoder side may alternatively generate the first tone mapping curve based on content of the binocular image.

For operation 810*a*, refer to operation 709*a*. Details are not described herein again.

FIG. 8B is a schematic diagram of another possible image processing procedure.

For operations 801*b* to 808*b*, refer to operations 701*b* to 708*b*. Details are not described herein again.

For operations 809*b* to 811*b*, refer to operations 808*a* to 810*a*. Details are not described herein again.

In a second possible scenario, the encoder side determines a weighted histogram, determines a second tone mapping curve based on the weighted histogram, and transmits a parameter of the second tone mapping curve to the decoder side. The decoder side performs tone mapping by using the second tone mapping curve. For example, the encoder side may be an image obtaining device, and the decoder side may be an image processing device.

Figure 9A:
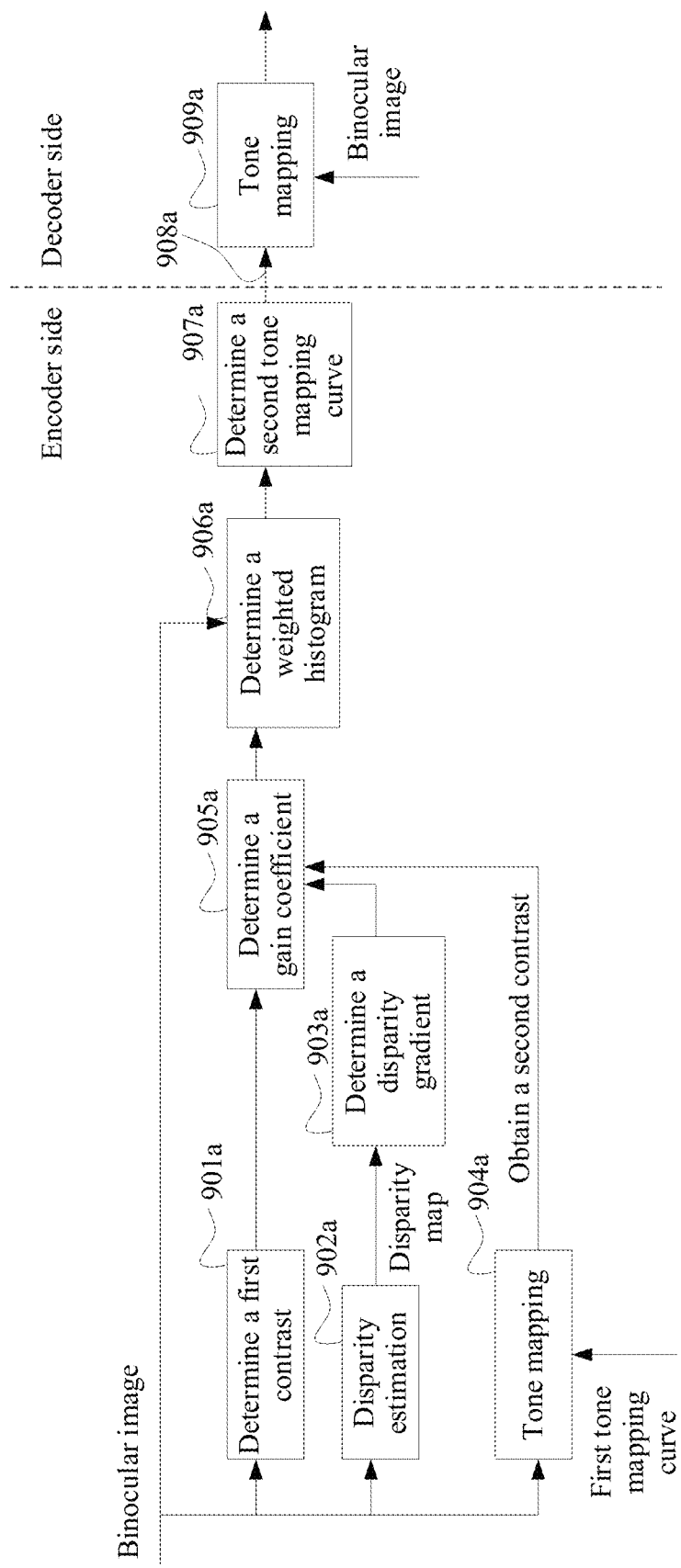
FIG. 9A is a schematic diagram of an image processing procedure provided in Example 3 according to an embodiment of this application.
Figure 9B:
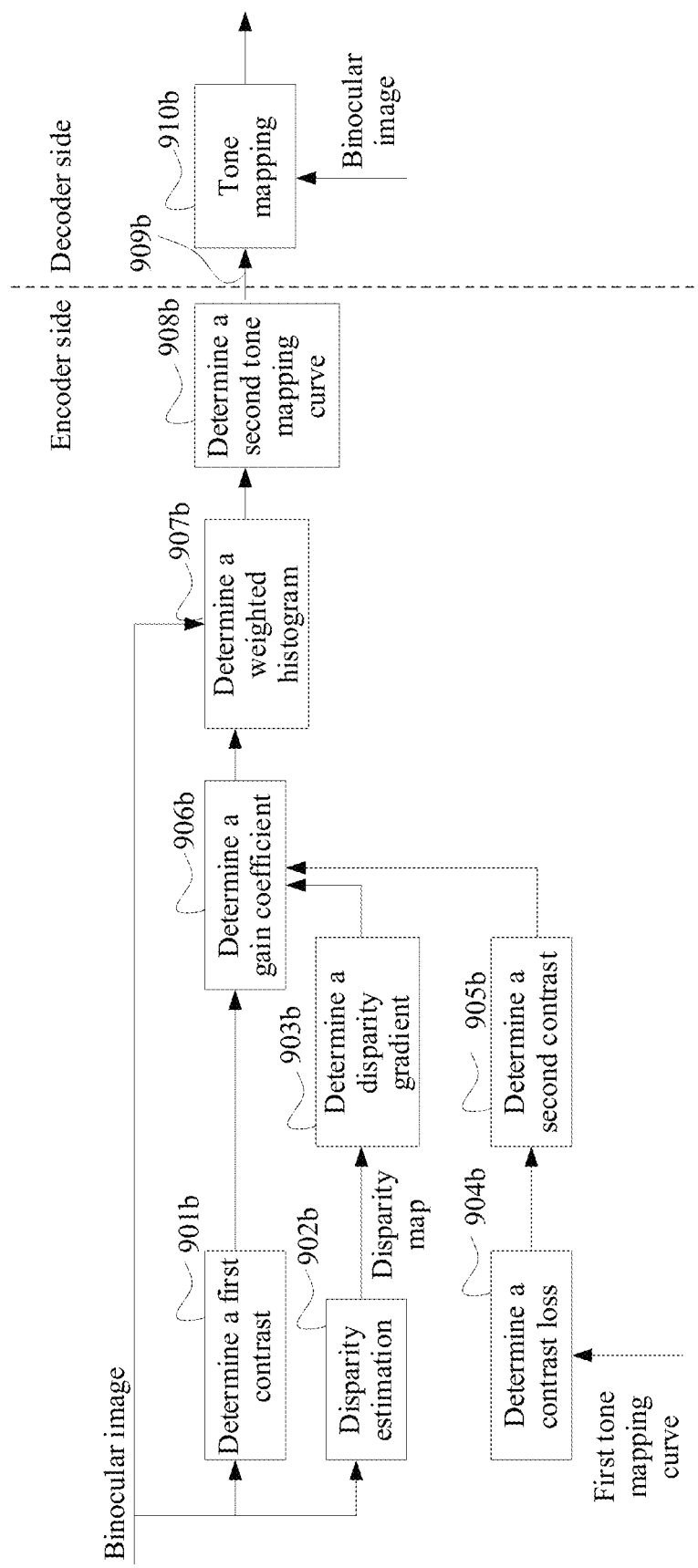
FIG. 9B is a schematic diagram of another image processing procedure provided in Example 3 according to an embodiment of this application.

Example 3: The first possible implementation is used to obtain a second tone mapping curve. Refer to FIG. 9A and FIG. 9B. FIG. 9A is a schematic flowchart of a possible image processing method.

For operations 901*a* to 906*a*, refer to operations 701*a* to 706*a*. Details are not described herein again.

In operation 907*a*, the encoder obtains a second tone mapping curve for a binocular image based on a weighted histogram.

In operation 908*a*, the encoder encodes the second tone mapping curve into a bitstream, and sends the bitstream to the decoder side. For example, the second tone mapping curve may be encoded into dynamic metadata of the bitstream. It should be understood that the bitstream may include data of a plurality of consecutive binocular images, and the second tone mapping curve included in the dynamic metadata may vary with a change of the binocular images in the bitstream.

In operation 909*a*, the decoder side decodes the bitstream to obtain the second tone mapping curve, performs tone mapping on the binocular image by using the second tone mapping curve, and outputs a tone mapped binocular image.

FIG. 9B is a schematic flowchart of another possible image processing method.

For operations 901*b* to 907*b*, refer to operations 701*b* to 707*b*. Details are not described herein again.

For operations 908*b* to 910*b*, refer to operations 907*a* to 909*a*. Details are not described herein again.

In a third possible scenario, an encoder side determines a weighted histogram, determines a third tone mapping curve based on the weighted histogram, and transmits a parameter of the third tone mapping curve to a decoder side. The decoder side performs weighted fusion based on the third tone mapping curve and a first tone mapping curve to obtain a second tone mapping curve, and performs tone mapping by using the second tone mapping curve. For example, the encoder side may be an image obtaining device, and the decoder side may be an image processing device.

Figure 10A:
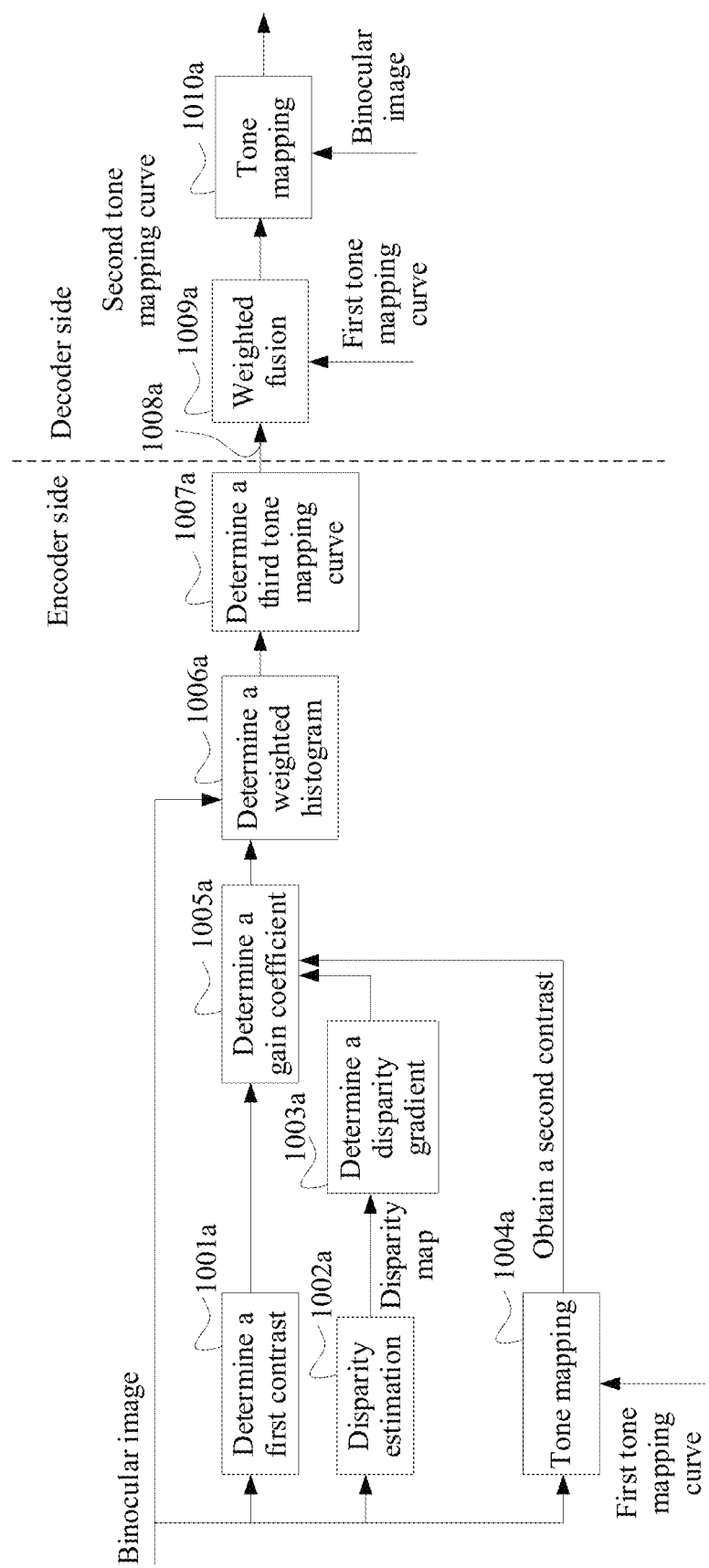
FIG. 10A is a schematic diagram of an image processing procedure provided in Example 4 according to an embodiment of this application.
Figure 10B:
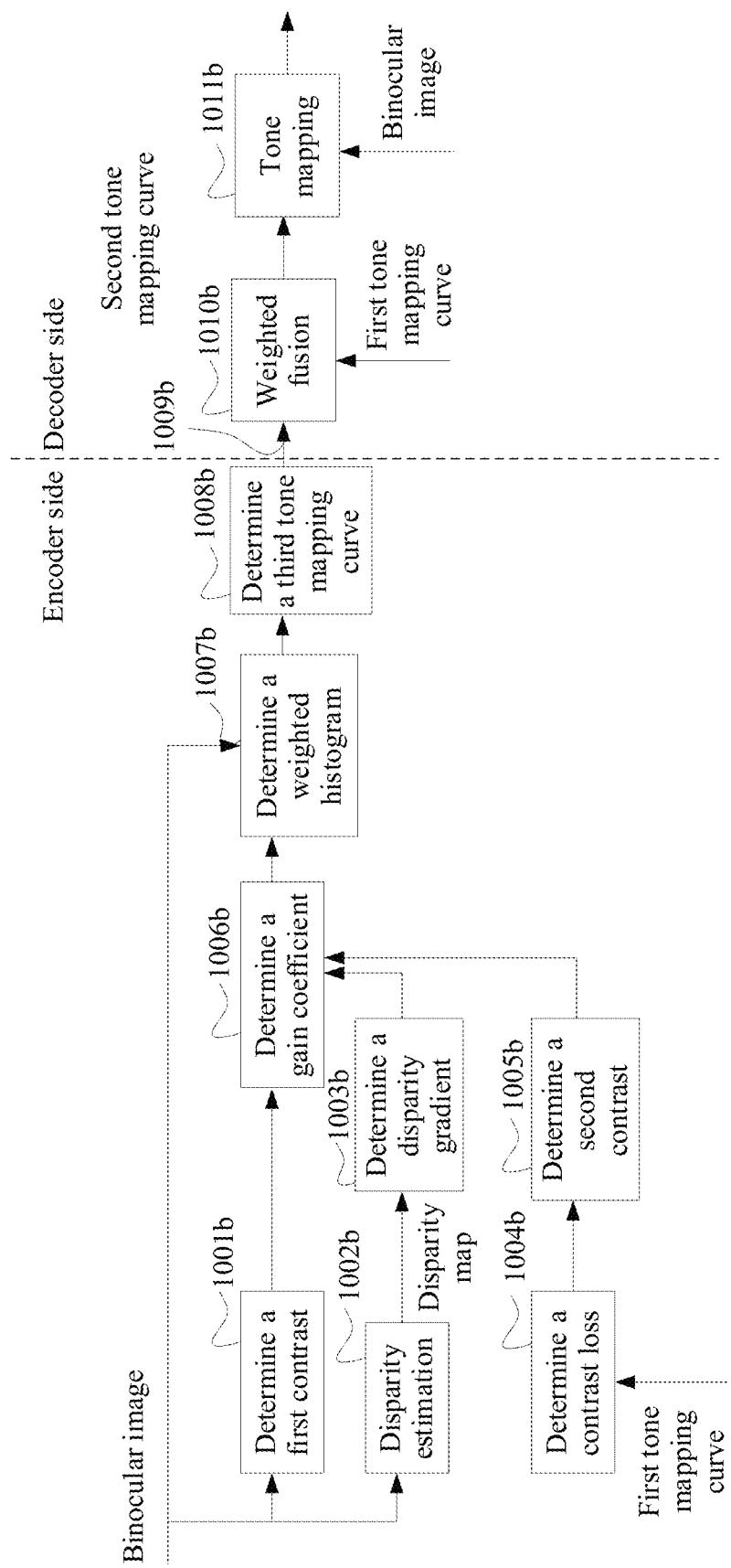
FIG. 10B is a schematic diagram of another image processing procedure provided in Example 4 according to an embodiment of this application.

Example 4: Refer to FIG. 10A and FIG. 10B. FIG. 10A is a schematic flowchart of a possible image processing method.

For operations 1001*a* to 1006*a*, refer to operations 801*a* to 806*a*. Details are not described herein again.

In operation 1007*a*, the encoder obtains a third tone mapping curve for a binocular image based on a weighted histogram.

In operation 1008*a*, the encoder encodes a parameter of the third tone mapping curve into a bitstream. In some embodiments, the encoder may further encode a first tone mapping curve into the bitstream.

In operation 1009*a*, the decoder side decodes the bitstream to obtain the third tone mapping curve, and performs weighted fusion based on the third tone mapping curve and the first tone mapping curve to obtain a second tone mapping curve.

In operation 1010*a*, the decoder side performs tone mapping on the binocular image by using the second tone mapping curve, and outputs a tone mapped binocular image.

FIG. 10B is a schematic flowchart of another possible image processing method.

For operations 1001*b* to 1007*b*, refer to operations 801*b* to 807*b*. Details are not described herein again.

For operations 1008*b* to 1011*b*, refer to operartions 1007*a* to 1010*a*. Details are not described herein again.

In an example, the encoder may perform weighted fusion based on a third tone mapping curve and a first tone mapping curve to obtain a second tone mapping curve, and then encode the second tone mapping curve into a bitstream. Then, the decoder directly obtains the second tone mapping curve from the bitstream, and performs tone mapping on a binocular image by using the second tone mapping curve.

In a fourth possible scenario, an encoder side does not determine a weighted histogram. Instead, the encoder side determines a third tone mapping curve based on a gain coefficient by solving a parameter of a tone mapping curve function, and transmits a parameter of the third tone mapping curve to a decoder side. The decoder side performs weighted fusion based on the third tone mapping curve and a first tone mapping curve to obtain a second tone mapping curve, and performs tone mapping by using the second tone mapping curve. For example, the encoder side may be an image obtaining device, and the decoder side may be an image processing device.

Figure 11A:
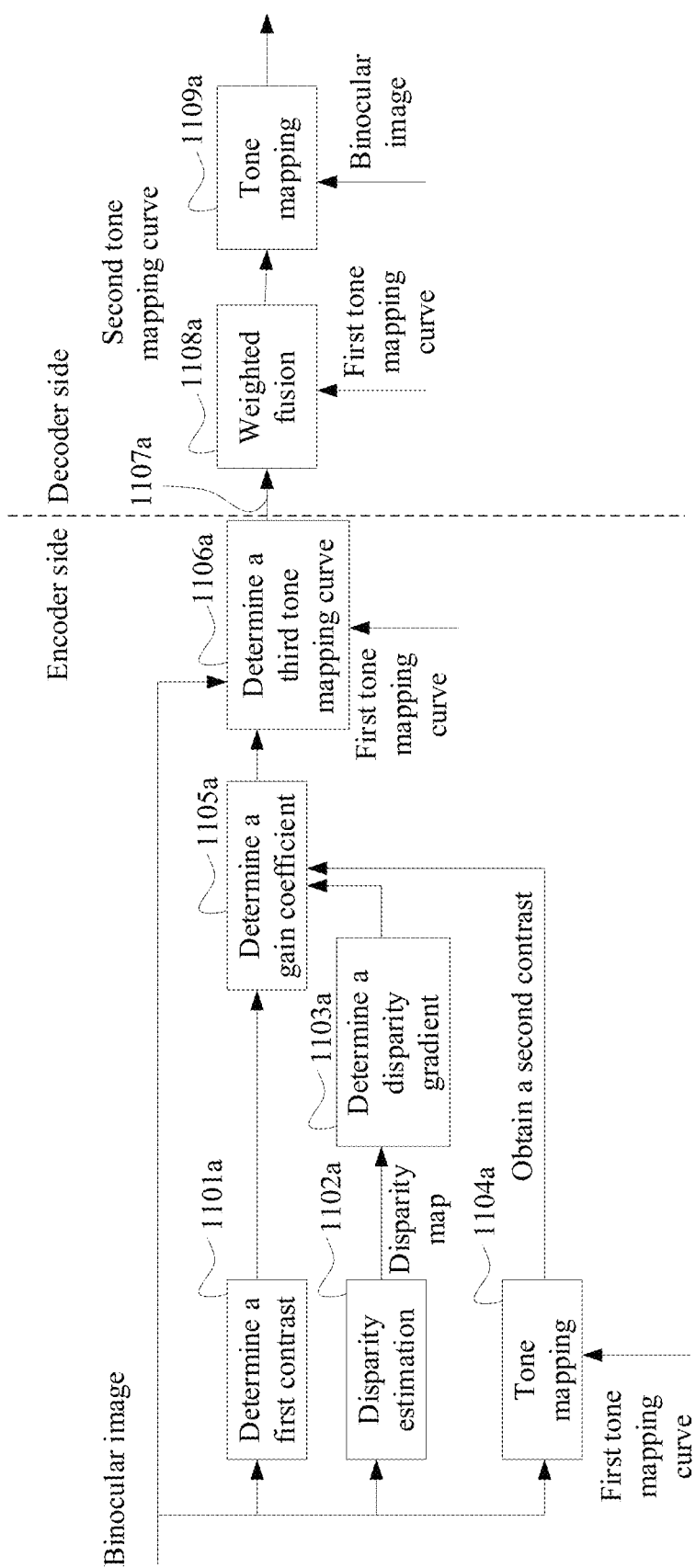
FIG. 11A is a schematic diagram of an image processing procedure provided in Example 5 according to an embodiment of this application.

Example 5: FIG. 11A is a schematic flowchart of a possible image processing method.

For operations 1101*a* to 1105*a*, refer to operations 701*a* to 705*a*. Details are not described herein again.

In operation 1106a, the encoder generates a third tone mapping curve based on a gain coefficient and a first tone mapping curve. For details, refer to the related descriptions in the fourth possible manner. Details are not described herein again.

In operation 1107a, the encoder encodes a parameter of the third tone mapping curve into a bitstream. In some embodiments, the encoder may further encode the first tone mapping curve into the bitstream.

In operation 1108a, the decoder side decodes the bitstream to obtain the third tone mapping curve, and performs weighted fusion based on the third tone mapping curve and the first tone mapping curve to obtain a second tone mapping curve.

In operation 1109a, the decoder side performs tone mapping on a binocular image by using the second tone mapping curve, and outputs a tone mapped binocular image.

Figure 11B:
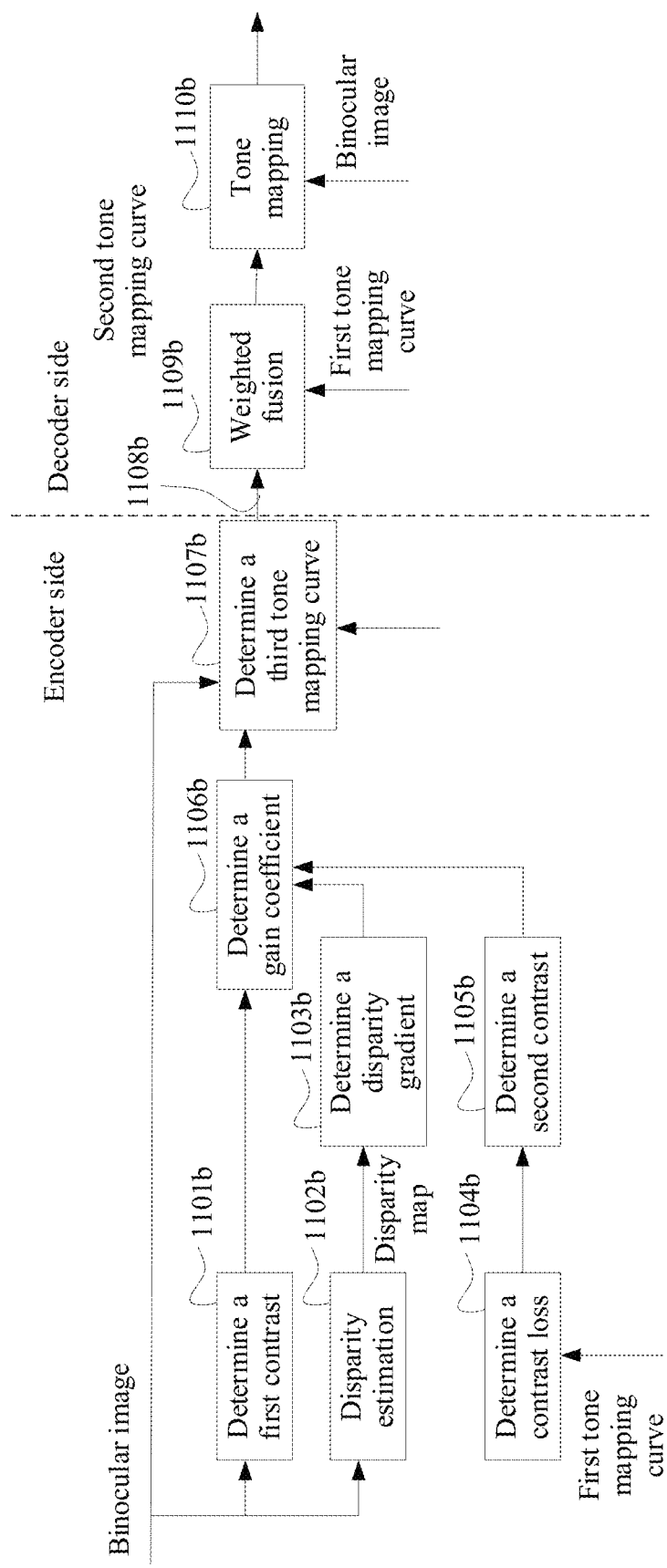
FIG. 11B is a schematic diagram of another image processing procedure provided in Example 6 according to an embodiment of this application.

Example 6: FIG. 11B is a schematic flowchart of another possible image processing method.

For operations 1101b to 1106b, refer to operations 701b to 706b. Details are not described herein again.

For operations 1107b to 1110b, refer to operations 1106a to 1109a. Details are not described herein again.

In a fifth possible scenario, an encoder side does not determine a weighted histogram. Instead, the encoder side determines a second tone mapping curve based on a gain coefficient by solving a parameter of a tone mapping curve function, and transmits a parameter of the second tone mapping curve to a decoder side. The decoder side performs tone mapping by using the second tone mapping curve. For example, the encoder side may be an image obtaining device, and the decoder side may be an image processing device.

Figure 12A:
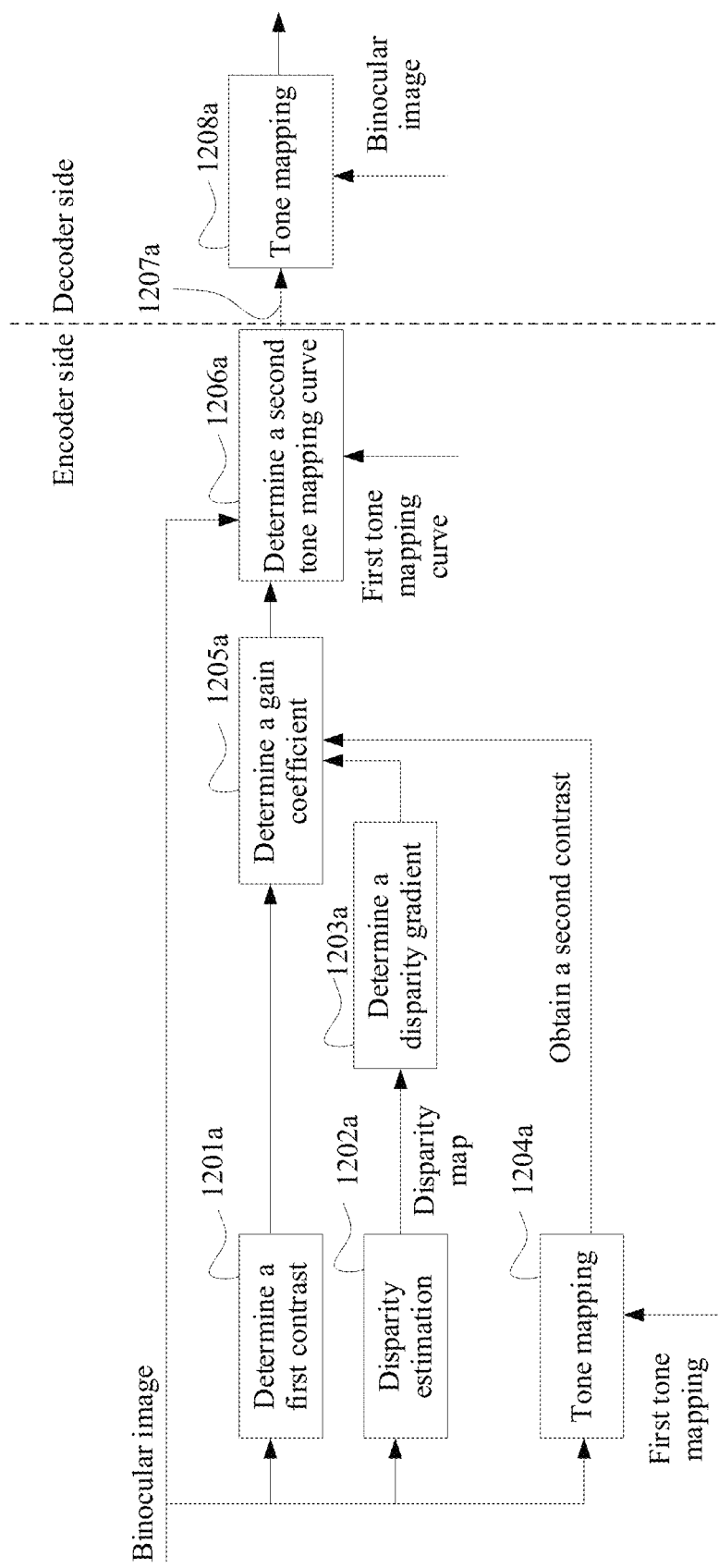
FIG. 12A is a schematic diagram of an image processing procedure provided in Example 7 according to an embodiment of this application.

Example 7: FIG. 12A is a schematic flowchart of a possible image processing method.

For operations 1201a to 1205a, refer to operations 701a to 705a. Details are not described herein again.

In operation 1206a, the encoder generates a second tone mapping curve based on a gain coefficient and a first tone mapping curve. For details, refer to the related descriptions in the fourth possible manner. Details are not described herein again.

In operation 1207a, the encoder encodes a parameter of the second tone mapping curve into a bitstream.

In operation 1208a, the decoder side decodes the bitstream to obtain the second tone mapping curve, performs tone mapping on a binocular image by using the second tone mapping curve, and outputs a tone mapped binocular image.

Figure 12B:
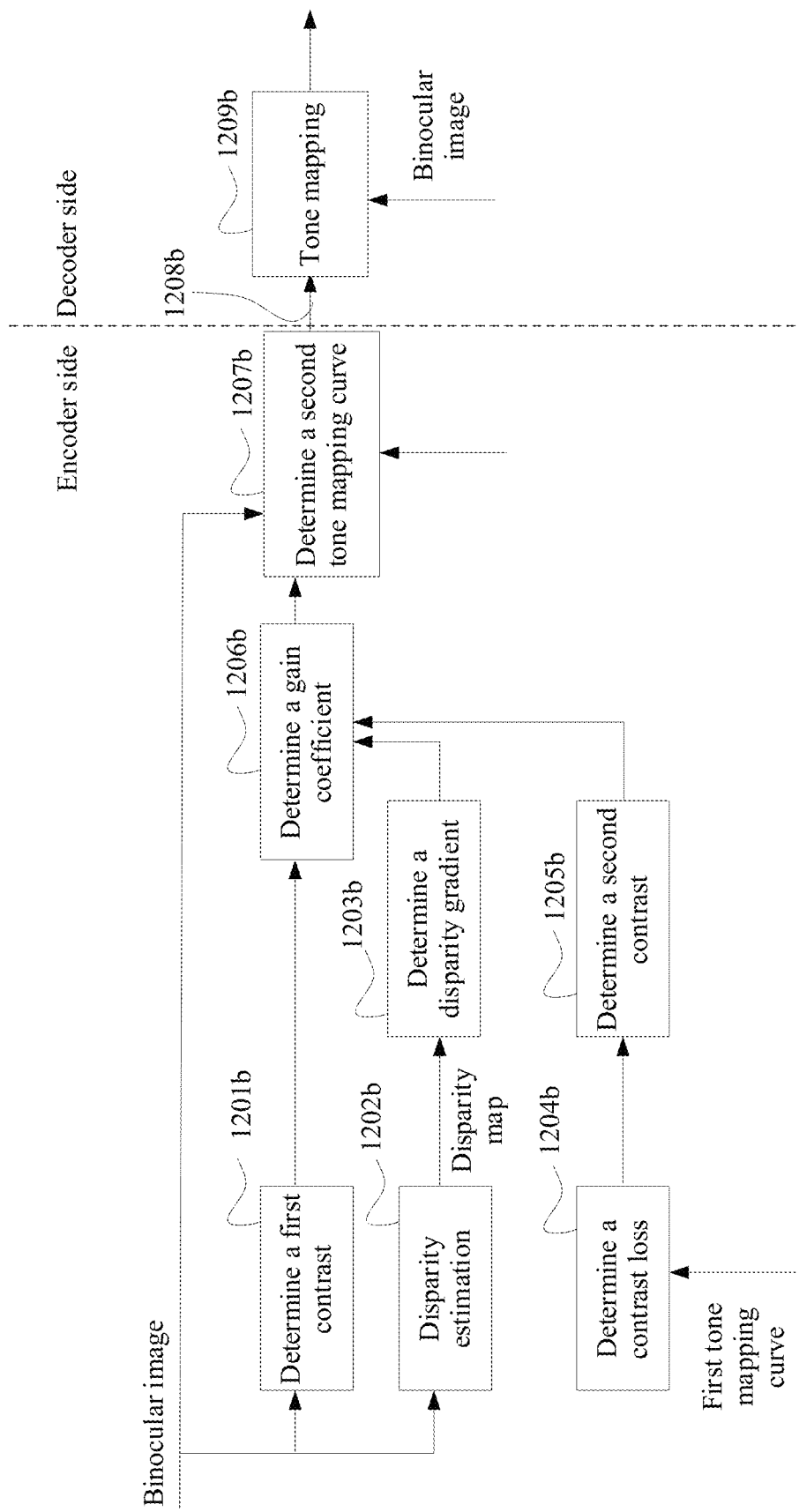
FIG. 12B is a schematic diagram of another image processing procedure provided in Example 7 according to an embodiment of this application.

FIG. 12B is a schematic flowchart of another possible image processing method.

For operations 1201b to 1206b, to operations 701b to 706bb. Details are not described herein again.

For operations 1207b to 1209b, refer to operations 1106a to 1108a. Details are not described herein again.

In a sixth possible scenario, all operations of generating a second tone mapping curve are performed by a decoder. An encoder may encode a binocular image into a bitstream. Alternatively, after a first tone mapping curve is determined, the binocular image and the first tone mapping curve are encoded into a bitstream.

Figure 13A:
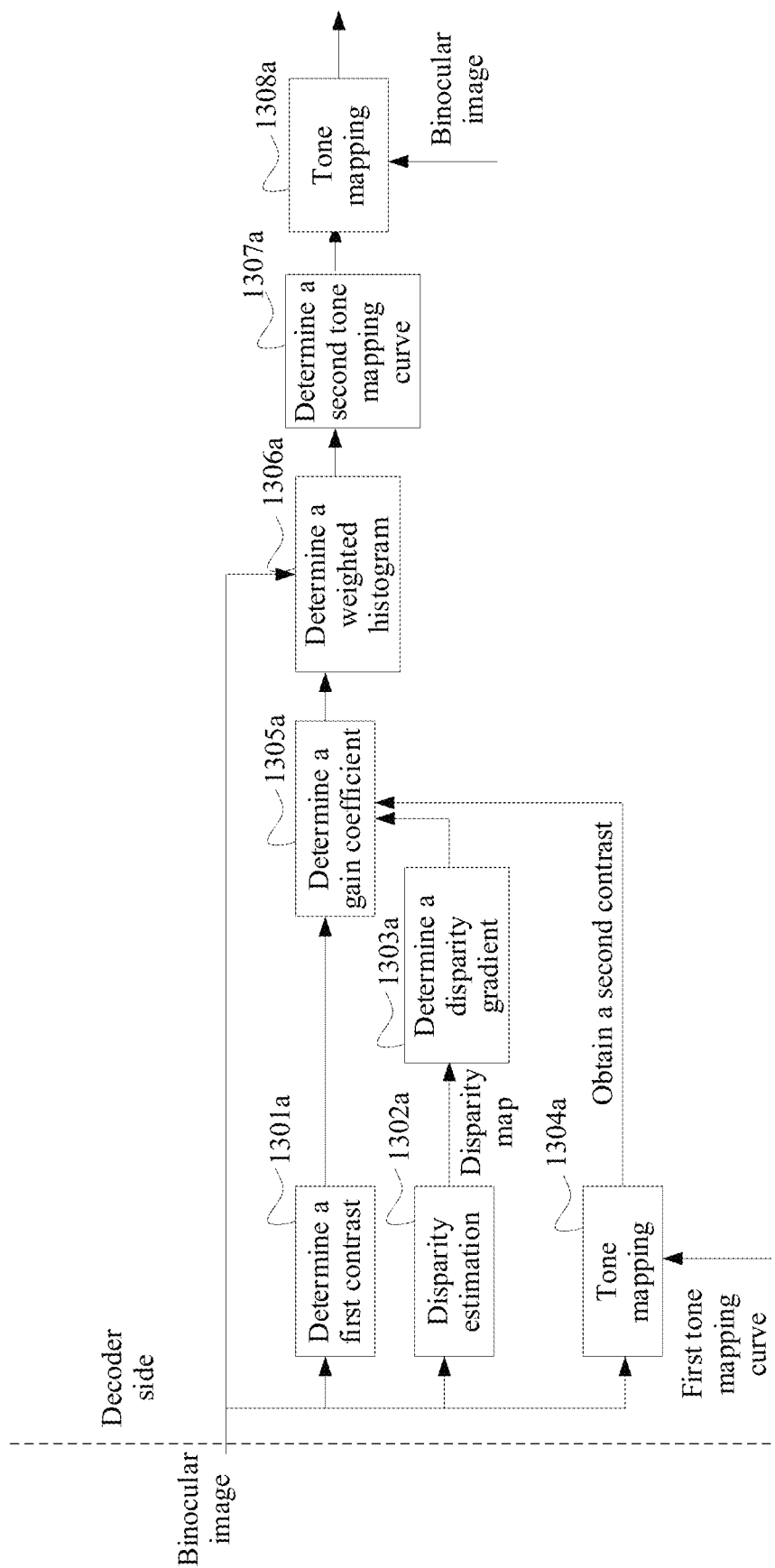
FIG. 13A is a schematic diagram of an image processing procedure provided in Example 8 according to an embodiment of this application.

Example 8: The first possible implementation is used to obtain a second tone mapping curve. FIG. 13A is a schematic flowchart of a possible image processing method.

In operation 1301a, the decoder obtains a first contrast of each pixel in a binocular image. For details, refer to the related descriptions of operation 502. Details are not described herein again. The binocular image may be any video frame of image in a video stream.

For example, the encoder may encode the binocular image into a bitstream and send the bitstream to the decoder.

In operation 1302a, the decoder performs disparity estimation on the binocular image to obtain a disparity map of each pixel in the binocular image. For details, refer to the related descriptions of operation 503. Details are not described herein again.

In operation 1303a, the decoder side determines a disparity gradient of each pixel based on the disparity map. For example, for a manner of determining the disparity gradient, refer to the related descriptions of operation 601. Details are not described herein again.

In operation 1304a, the decoder side performs tone mapping on the binocular image by using a first tone mapping curve, and obtains a second contrast of each pixel in a tone mapped binocular image. For details, refer to the related descriptions of operation 504. Details are not described herein again.

In an example, the encoder side may generate the first tone mapping curve based on content of the binocular image, and encode a parameter of the first tone mapping curve into a bitstream. In another example, the decoder side may generate the first tone mapping curve based on content of the binocular image decoded from the bitstream.

In operation 1305a, the decoder side obtains a gain coefficient of each pixel based on the first contrast, the second contrast, and the disparity gradient of each pixel. For details, refer to the related descriptions of operation 602. Details are not described herein again.

In operation 1306a, the decoder side obtains a weighted histogram of the binocular image by using the gain coefficient of each pixel as a weight.

In operation 1307a, the decoder side obtains a second tone mapping curve for the binocular image based on the weighted histogram.

For example, the second tone mapping curve may be generated based on the weighted histogram by using a histogram equalization method. For details, refer to the related descriptions in the first possible manner. Details are not described herein again.

In operation 1308a, the decoder side performs tone mapping on the binocular image by using the second tone mapping curve, and outputs a tone mapped binocular image.

In an example, the decoder side may further perform other processing on the binocular image before tone mapping, or perform other processing on the tone mapped binocular image after tone mapping and before the output. This is not limited in this embodiment of this application.

Figure 13B:
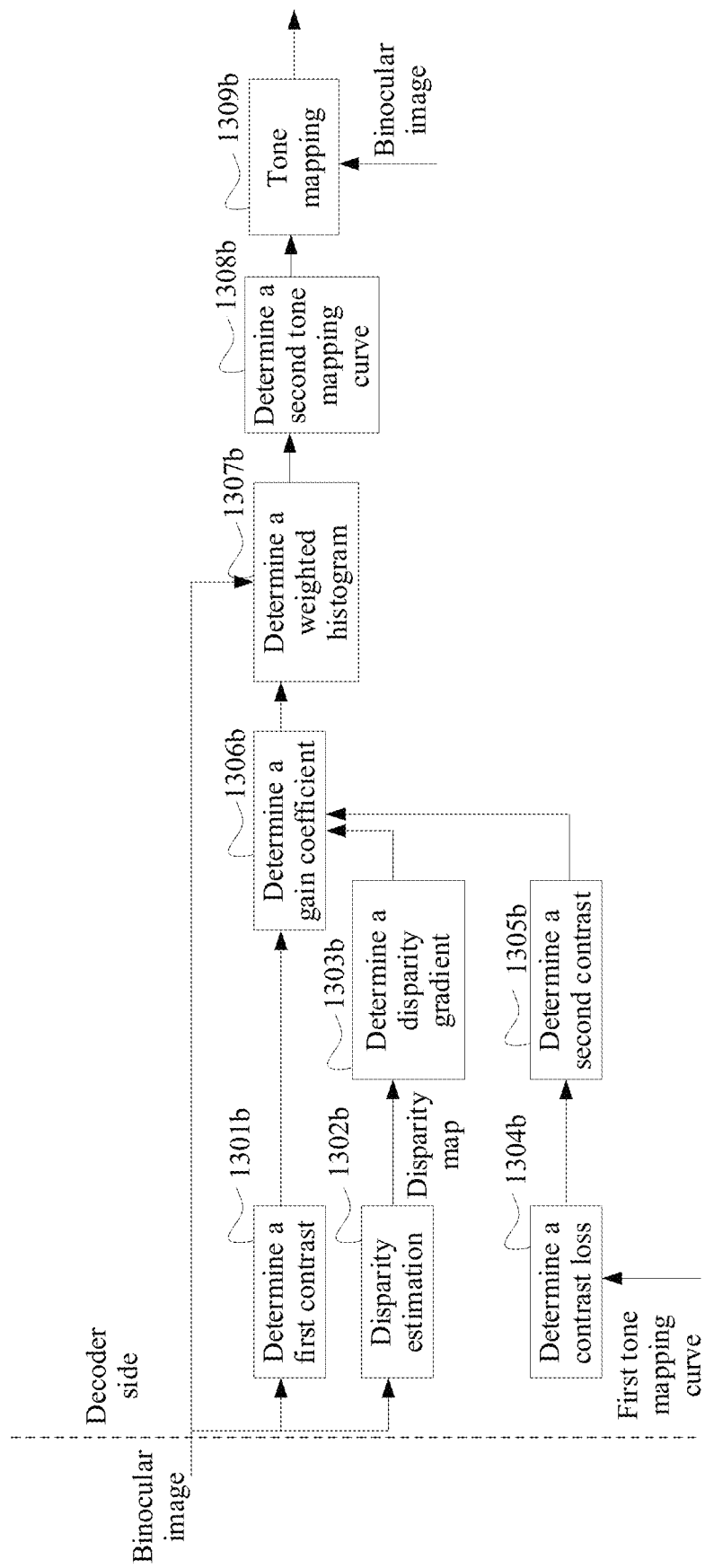
FIG. 13B is a schematic diagram of another image processing procedure provided in Example 9 according to an embodiment of this application.

Example 9: The second possible implementation is used to obtain a second tone mapping curve. FIG. 13B is a schematic flowchart of a possible image processing method.

For operations 1301b to 1306b, refer to operations 1301a to 1306a. Details are not described herein again.

For operations 1307b to 1309b, to operations 808a to 810a. Details are not described herein again.

Figure 14A:
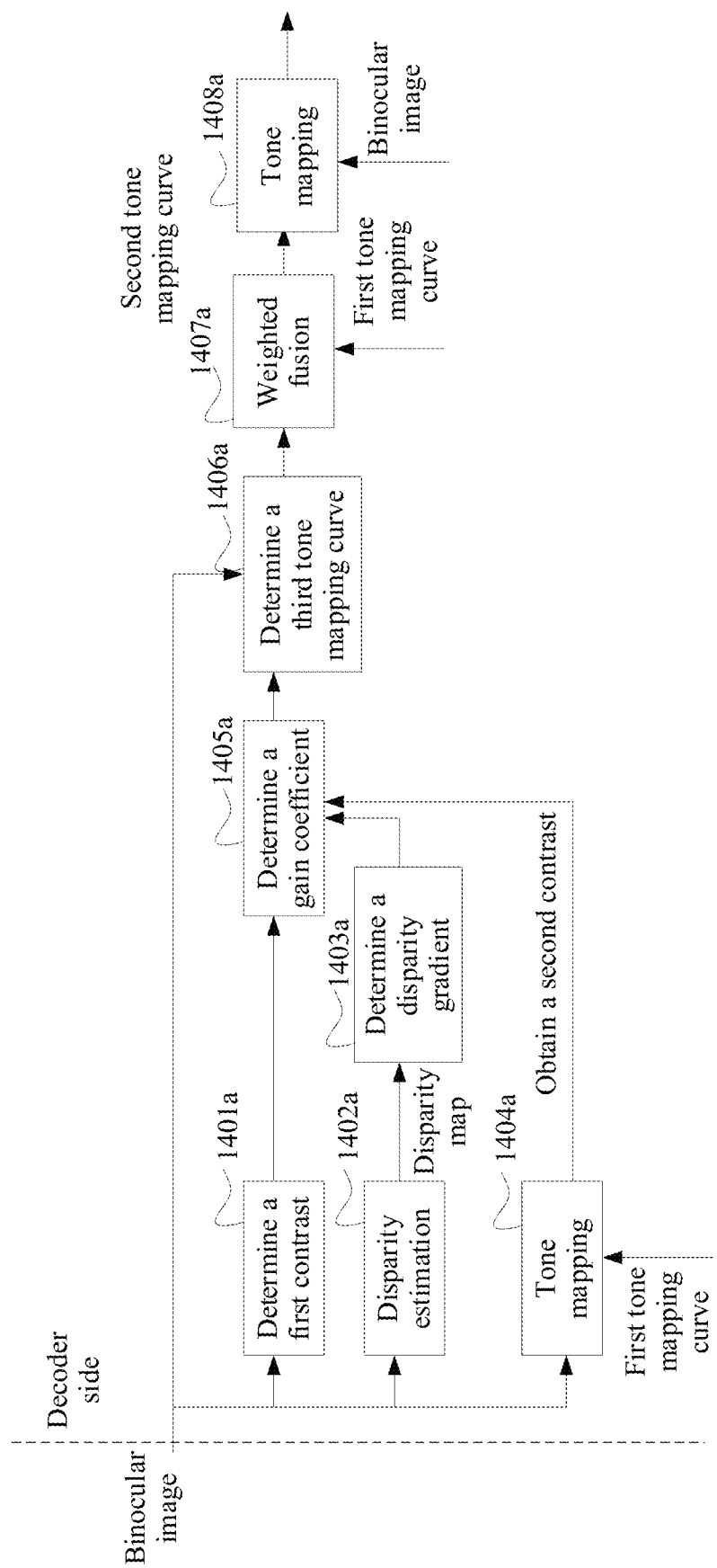
FIG. 14A is a schematic diagram of an image processing procedure provided in Example 10 according to an embodiment of this application.

Example 10: The fourth possible implementation is used to obtain a second tone mapping curve. Refer to FIG. 14A. FIG. 14A is a schematic flowchart of a possible image processing method.

For operations 1401a to 1405a, refer to operations 1301a to 1305a. Details are not described herein again.

In operation 1406a, the decoder generates a third tone mapping curve based on a gain coefficient and a first tone mapping curve. For details, refer to the related descriptions in the fourth possible manner. Details are not described herein again.

In operation 1407a, the decoder side performs weighted fusion based on the third tone mapping curve and the first tone mapping curve to obtain a second tone mapping curve.

In operation 1408a, the decoder side performs tone mapping on a binocular image by using the second tone mapping curve, and outputs a tone mapped binocular image.

Figure 14B:
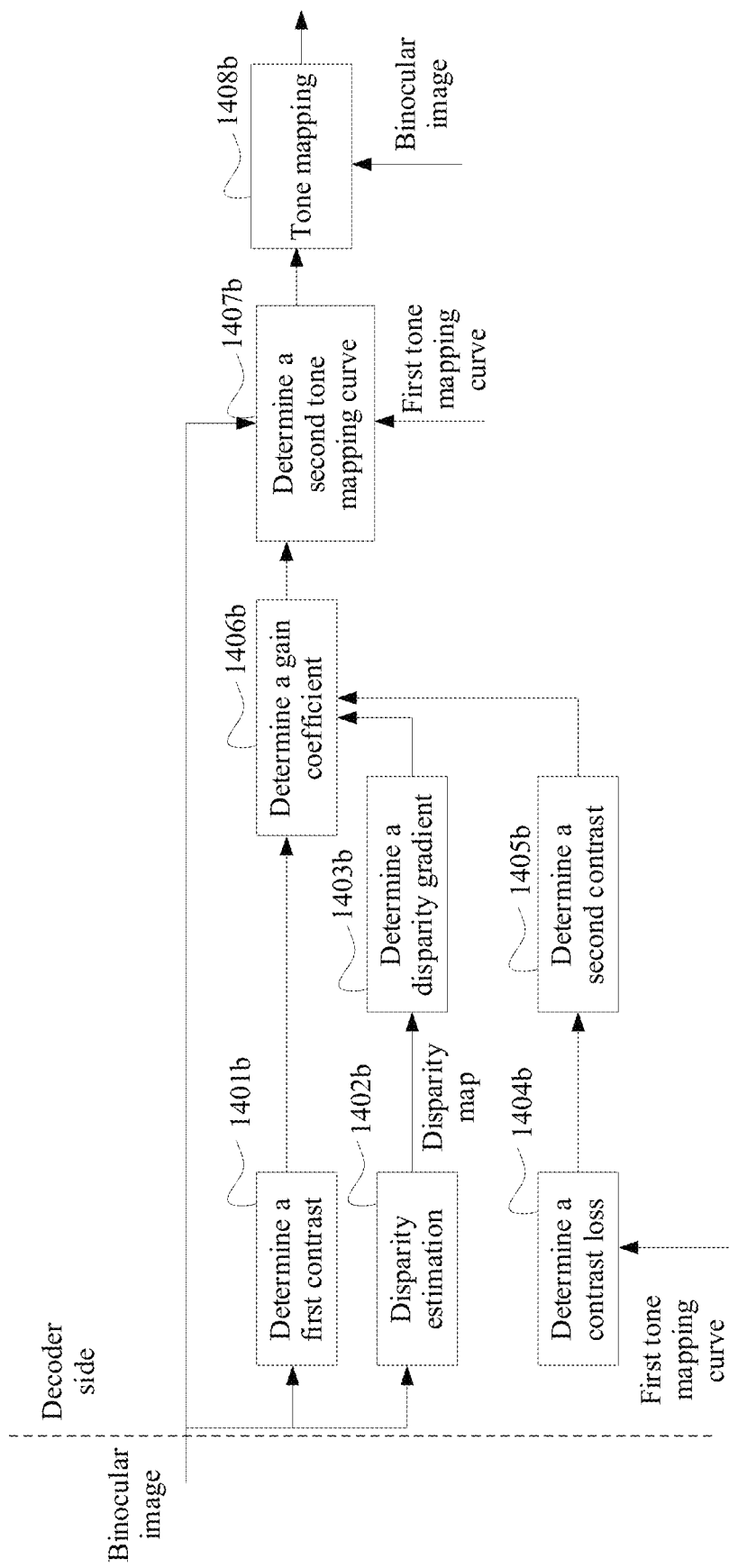
FIG. 14B is a schematic diagram of another image processing procedure provided in Example 11 according to an embodiment of this application.

Example 11: The third possible implementation is used to obtain a second tone mapping curve. Refer to FIG. 14B. FIG. 14B is a schematic flowchart of a possible image processing method.

For operations 1401b to 1406b, refer to operations 1301b to 1306b. Details are not described herein again.

In operation 1407b, the decoder generates a second tone mapping curve based on a gain coefficient and a first tone mapping curve. For details, refer to the related descriptions in the third possible manner. Details are not described herein again.

In operation 1408b, the decoder side performs tone mapping on a binocular image by using the second tone mapping curve, and outputs a tone mapped binocular image.

Figure 15A:
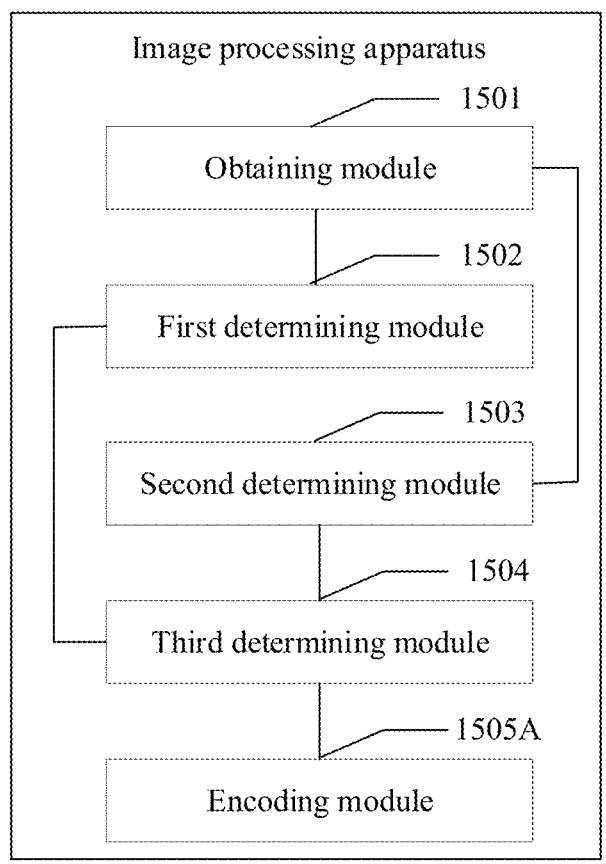
FIG. 15A is a schematic diagram of an image processing apparatus according to an embodiment of this application.
Figure 15B:
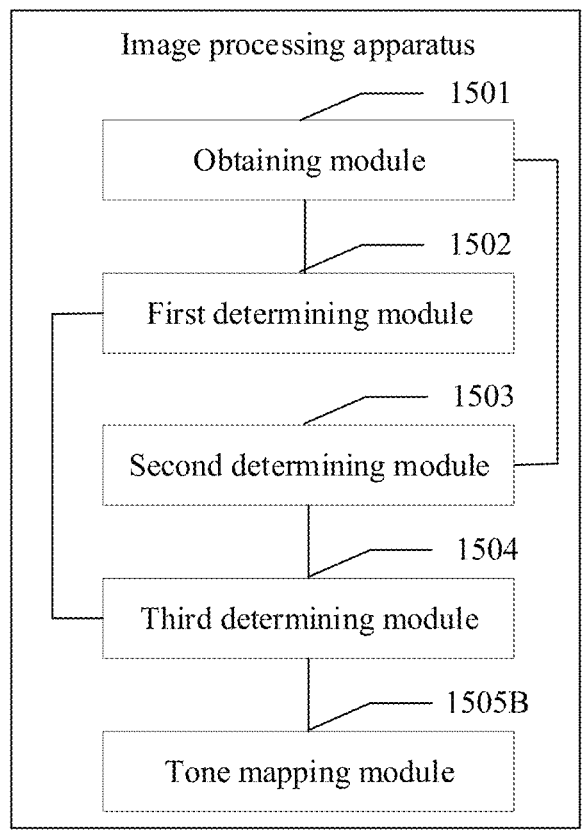
FIG. 15B is a schematic diagram of another image processing apparatus according to an embodiment of this application.

Based on a same invention concept as that of the foregoing method, an embodiment of this application provides an image processing apparatus. Refer to FIG. 15A and FIG. 15B. The image processing apparatus may include an obtaining module 1501, a first determining module 1502, a second determining module 1503, and a third determining module 1504. The image processing apparatus may be applied to an encoder or a decoder.

The obtaining module 1501 is configured to: obtain a binocular image, and generate a first tone mapping curve for the binocular image, where the binocular image is a high dynamic range HDR image.

The first determining module 1502 is configured to obtain a first contrast of the binocular image and a disparity map of the binocular image.

The second determining module 1503 is configured to obtain a second contrast of a tone mapped binocular image obtained by performing tone mapping on the binocular image based on the first tone mapping curve.

The third determining module 1504 is configured to obtain a second tone mapping curve based on the first contrast, the second contrast, and the disparity map.

The second tone mapping curve is used to enable a contrast of the tone mapped binocular image to meet a minimum disparity variation requirement for 3D perception by human eyes.

In an embodiment, the third determining module 1504 is configured to: determine a disparity gradient of a first pixel based on the disparity map, where the first pixel is any pixel in the binocular image; obtain a gain coefficient of the first pixel based on a first contrast of the first pixel, a second contrast of the first pixel, and the disparity gradient of the first pixel, where the gain coefficient is used to compensate for a reduced contrast of the first pixel caused by tone mapping; and obtain the second tone mapping curve based on a determined gain coefficient of each pixel in the binocular image.

In an embodiment, the gain coefficient meets the following condition:

$$Q(x, y) = \min\left(\frac{K^{-1}(D'(x, y))}{C_{tm}(x, y)}, \frac{C(x, y)}{C_{tm}(x, y)}\right),$$

where

Q(x,y) represents a gain coefficient of a pixel, x represents a horizontal coordinate of the pixel, y represents a vertical coordinate of the pixel, D'(x,y) represents a disparity gradient of the pixel, $K^{-1}($ ) represents an inverse function of a function describing a relationship between disparity perception sensitivity and a contrast, C(x,y) represents a first contrast of the pixel, and $C_{tm}(x,y)$ represents a second contrast of the pixel.

In an embodiment, the function describing a relationship between disparity perception sensitivity and contrast meets the following condition:

$$K(c) = J\frac{3.34c}{c - 1.77},$$

where c represents the contrast, K(c) represents the disparity perception sensitivity, and J represents a fitting coefficient.

In an embodiment, when obtaining the second tone mapping curve based on the gain coefficient, the third determining module 1504 is configured to: obtain a weighted histogram based on pixel values of pixels included in the binocular image, using a gain coefficient as a weight; and generate the second tone mapping curve based on the weighted histogram.

In an embodiment, when obtaining the second tone mapping curve based on the gain coefficient, the third determining module 1504 is configured to: obtain a weighted histogram based on pixel values of pixels included in the binocular image, using a gain coefficient as a weight; generate a third tone mapping curve based on the weighted histogram; and perform weighting processing on the first tone mapping curve and the third tone mapping curve to obtain the second tone mapping curve.

In an embodiment, the weighted histogram meets the following condition:

$$h_i = \Sigma_{(x,y): l_i \leq I(x,y) < l_{i+1}} Q(x,y) \cdot w(x,y), \text{ where}$$

Q(x,y) represents the gain coefficient of the pixel, w(x,y) represents an adjustment factor of the pixel, I(x,y) represents a pixel value of the pixel, $i_l$ represents an edge of an $i^{th}$ histogram interval, and $h_l$ represents a value of the $i^{th}$ histogram interval of the weighted histogram.

In an embodiment, when obtaining the second tone mapping curve based on the gain coefficient, the third determining module 1504 is configured to: solve a parameter of the second tone mapping curve based on the gain coefficient in the following manner:

$$\arg\min_{\text{parameter of the second tone mapping curve}} \sum_{x,y} \left(\frac{L'_{3D}(I(x, y))}{L'_{2D}(I(x, y))} - Q(x, y)\right)^2,$$

where $L'_{2D}$ represents a derivative of a first tone mapping curve function, $L'_{3D}$ represents a derivative of a second tone mapping curve function, Q(x,y) represents the gain coefficient of the pixel, and arg min ( ) represents a value of the parameter of the second tone mapping curve when a minimum value is reached in the brackets.

In an embodiment, when obtaining the second tone mapping curve based on the gain coefficient, the third determining module 1504 is configured to: solve a parameter of a third tone mapping curve based on the gain coefficient in the following manner:

$$\arg\min_{parameter\ of\ the\ second\ tone\ mapping\ curve} \sum_{x,y} \left(\frac{L'_{3D}(I(x,y))}{L'_{2D}(I(x,y))} - Q(x,y)\right)^2,$$

where $L'_{2D}$ represents a derivative of a first tone mapping curve function, $L'_{3D}$ represents a derivative of a third tone mapping curve function, $Q(x,y)$ represents the gain coefficient of the pixel, and arg min ( ) represents a value of the parameter of the second tone mapping curve when a minimum value is reached in the brackets; and perform weighting processing on the first tone mapping curve and the third tone mapping curve to obtain the second tone mapping curve.

In an embodiment, the second determining module 1503 is configured to: perform tone mapping on the binocular image based on the first tone mapping curve, and obtain the second contrast of the tone mapped binocular image; or estimate, based on the first tone mapping curve, a contrast loss value, of the binocular image, existing after tone mapping is performed based on the first tone mapping curve, and obtain the second contrast based on the contrast loss value and the first contrast.

In some scenarios, when the image processing apparatus is applied to an encoder, the image processing apparatus may further include an encoding module 1505A, configured to encode the weighted histogram into dynamic metadata of a bitstream, or configured to encode the second tone mapping curve into dynamic metadata of a bitstream.

In some scenarios, when the image processing apparatus is applied to a decoder, the image processing apparatus further includes a tone mapping module 1505B, configured to perform tone mapping on the binocular image by using the second tone mapping curve.

Figure 16:
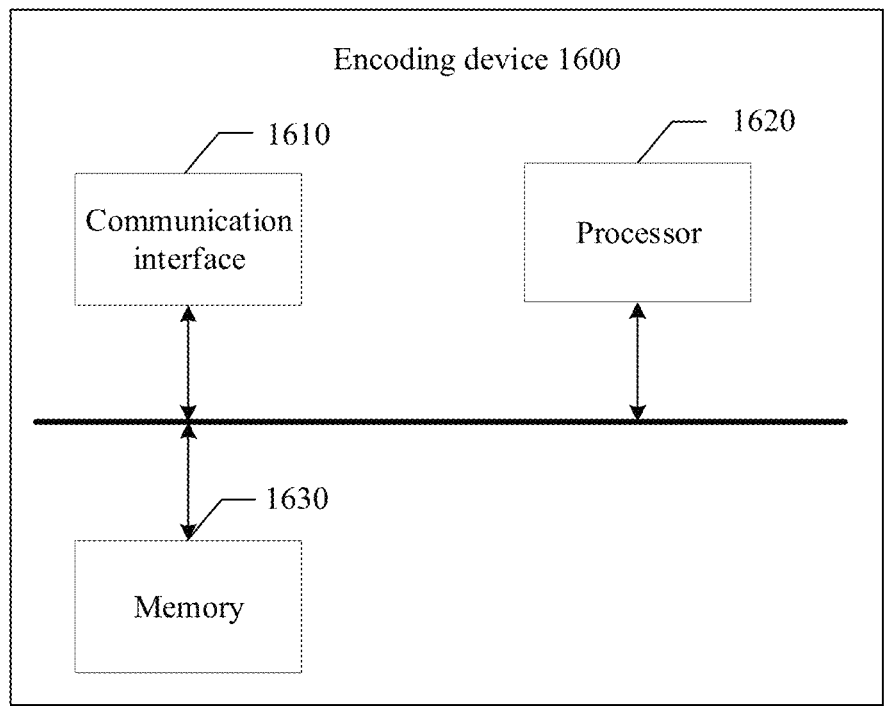
FIG. 16 is a schematic diagram of a structure of an encoding device according to an embodiment of this application.

An embodiment of this application further provides an encoding device. As shown in FIG. 16, the encoding device 1600 may include a communication interface 1610 and a processor 1620. Optionally, the encoding device 1600 may further include a memory 1630. The memory 1630 may be disposed inside the encoding device, or may be disposed outside the encoding device. The obtaining module 1501, the first determining module 1502, the second determining module 1503, the third determining module 1504, and the encoding module 1505A shown in FIG. 15A may all be implemented by the processor 1620.

In an embodiment, the processor 1620 is configured to implement any method performed by the encoder side in FIG. 7A to FIG. 14B, and output an encoded bitstream through the communication interface 1610.

During implementation, operations in a processing procedure may be implemented by an integrated logic circuit of hardware in the processor 1620 or by instructions in a form of software, to perform the methods performed by the encoder side in FIG. 7A to FIG. 14B. For brevity, details are not described herein again. Program code executed by the processor 1620 for implementing the foregoing methods may be stored in the memory 1630. The memory 1630 is coupled to the processor 1620.

Any communication interface in embodiments of this application may be a circuit, a bus, a transceiver, or another apparatus that can be used for information exchange, for example, the communication interface 1610 in the encoding device 1600. For example, the another apparatus may be a device connected to the encoding device 1600. For example, the another apparatus may be a decoding device or the like.

The processor 1620 may collaboratively operate with the memory 1630. The memory 1630 may be a nonvolatile memory such as a hard disk drive (HDD) or a solid-state drive SSD), or may be a volatile memory such as a random access memory (RAM). The memory 1630 is any other medium that can be used to carry or store expected program code in a form of instructions or data structures and that can be accessed by a computer, but is not limited thereto.

A specific connection medium between the communication interface 1610, the processor 1620, and the memory 1630 is not limited in this embodiment of this application. In this embodiment of this application, the memory 1630, the processor 1620, and the communication interface 1610 are connected to each other through a bus in FIG. 16. The bus is represented by using a thick line in FIG. 16. A connection manner between other components is only an example for descriptions, and is not limited thereto. The bus may be categorized as an address bus, a data bus, a control bus, or the like. For ease of representation, only one thick line is used to represent the bus in FIG. 16, but this does not mean that there is only one bus or only one type of bus.

Figure 17:
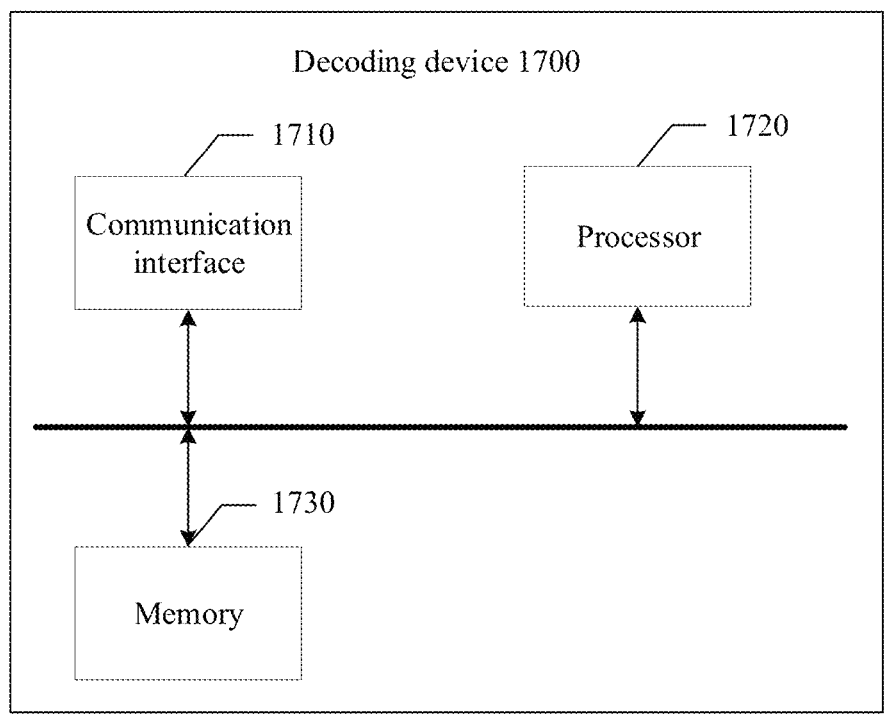
FIG. 17 is a schematic diagram of a structure of a decoding device according to an embodiment of this application.

An embodiment of this application further provides a decoding device. As shown in FIG. 17, the decoding device 1700 may include a communication interface 1710 and a processor 1720. Optionally, the decoding device 1700 may further include a memory 1730. The memory 1730 may be disposed inside the decoding device, or may be disposed outside the decoding device. The obtaining module 1501, the first determining module 1502, the second determining module 1503, the third determining module 1504, and the tone mapping module 1505B shown in FIG. 15B may all be implemented by the processor 1720.

In an embodiment, the processor 1720 is configured to obtain a bitstream through the communication interface 1710, and implement any method performed by the decoder side in FIG. 7A to FIG. 14B.

During implementation, operations in a processing procedure may be implemented by an integrated logic circuit of hardware in the processor 1720 or by instructions in a form of software, to perform the methods performed by the encoder side in FIG. 7A to FIG. 14B. For brevity, details are not described herein again. Program code executed by the processor 1720 for implementing the foregoing methods may be stored in the memory 1730. The memory 1730 is coupled to the processor 1720.

Any communication interface in embodiments of this application may be a circuit, a bus, a transceiver, or another apparatus that can be used for information exchange, for example, the communication interface 1710 in the decoding device 1700. For example, the another apparatus may be a device connected to the decoding device 1700. For example, the another apparatus may be a decoding device or the like.

The processor 1720 may collaboratively operate with the memory 1730. The memory 1730 may be a nonvolatile memory such as a hard disk drive (HDD) or a solid-state drive (SSD), or may be a volatile memory such as a random access memory (RAM). The memory 1730 is any other medium that can be used to carry or store expected program code in a form of instructions or data structures and that can be accessed by a computer, but is not limited thereto.

A specific connection medium between the communication interface 1710, the processor 1720, and the memory 1730 is not limited in this embodiment of this application. In this embodiment of this application, the memory 1730, the processor 1720, and the communication interface 1710 are connected to each other through a bus in FIG. 17. The bus is represented by using a thick line in FIG. 17. A connection manner between other components is only an example for descriptions, and is not limited thereto. The bus may be categorized as an address bus, a data bus, a control bus, or the like. For ease of representation, only one thick line is used to represent the bus in FIG. 17, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor, or may be any conventional processor or the like. The operations of the method disclosed with reference to embodiments of this application may be directly performed by a hardware processor, or may be performed by a combination of hardware in the processor and a software module.

The coupling in embodiments of this application is indirect coupling or a communication connection between apparatuses, modules, or modules for information exchange between the apparatuses, the units, or the modules, and may be in electrical, mechanical, or other forms.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement functions in any one or more of the foregoing embodiments, for example, configured to implement the methods performed by the encoder side in FIG. 7A to FIG. 14B, or configured to implement the methods performed by the decoding device in FIG. 7A to FIG. 14B. Optionally, the chip further includes a memory, and the memory is configured to store necessary program instructions and data that are executed by the processor. The chip may include a chip, or may include a chip and another discrete device.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a processor of a general-purpose computer, a dedicated computer, an embedded processor, or another programmable data processing device to generate a machine, so that the instructions executed by the processor of the computer or another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more procedures in the flowcharts and/or in one or more blocks in the block diagrams.

It is clear that a person skilled in the art can make various modifications and variations to embodiments of this application without departing from the scope of embodiments of this application. This application is intended to cover these modifications and variations of embodiments of this application provided that they fall within the scope of protection defined by the following claims and their equivalent technologies.

What is claimed is:

1. A method for processing images, comprising:
   obtaining a binocular image, and generating a first tone mapping curve for the binocular image, wherein the binocular image is a high dynamic range (HDR) image;
   obtaining a first contrast of the binocular image and a disparity map of the binocular image;
   obtaining a second contrast of a tone mapped binocular image obtained by performing tone mapping on the binocular image based on the first tone mapping curve; and
   obtaining a second tone mapping curve based on the first contrast, the second contrast, and the disparity map.

2. The method according to claim 1, wherein the obtaining a second tone mapping curve based on the first contrast, the second contrast, and the disparity map comprises:
   determining a disparity gradient of a first pixel in the binocular image based on the disparity map;
   obtaining a gain coefficient of the first pixel based on a first contrast of the first pixel, a second contrast of the first pixel, and the disparity gradient of the first pixel, wherein the gain coefficient is used to compensate for a reduced contrast of the first pixel caused by tone mapping; and obtaining the second tone mapping curve based on a determined gain coefficient of each pixel in the binocular image.

3. The method according to claim 2, wherein the gain coefficient is determined based on following formula:

$$Q(x, y) = \min\left(\frac{K^{-1}(D'(x, y))}{C_{tm}(x, y)}, \frac{C(x, y)}{C_{tm}(x, y)}\right),$$

wherein
Q(x,y) represents a gain coefficient of a pixel, x represents a horizontal coordinate of the pixel, y represents a vertical coordinate of the pixel, D' (x,y) represents a disparity gradient of the pixel, $K^{-1}$( ) represents an inverse function of a function describing a relationship between disparity perception sensitivity and a contrast, C(x,y) represents a first contrast of the pixel, and $C_{tm}$(x,y) represents a second contrast of the pixel.

4. The method according to claim 3, wherein the function describing a relationship between disparity perception sensitivity and contrast meets the following condition:

$$K(c) = J\frac{3.34c}{c - 1.77},$$

wherein
c represents the contrast, K(c) represents the disparity perception sensitivity, and J represents a fitting coefficient.

5. The method according to claim 2, wherein the obtaining the second tone mapping curve based on a gain coefficient comprises:
obtaining a weighted histogram based on pixel values of pixels comprised in the binocular image, using a gain coefficient as a weight; and
generating the second tone mapping curve based on the weighted histogram.

6. The method according to claim 2, wherein the obtaining the second tone mapping curve based on a gain coefficient comprises:
obtaining a weighted histogram based on pixel values of pixels comprised in the binocular image, using a gain coefficient as a weight;
generating a third tone mapping curve based on the weighted histogram; and
performing weighting processing on the first tone mapping curve and the third tone mapping curve to obtain the second tone mapping curve.

7. The method according to claim 5, wherein the weighted histogram meets the following condition:

$h_i = \Sigma_{(x,y): l_i \leq I(x,y) < l_{i+1}} Q(x,y) \cdot w(x,y)$, wherein

Q(x,y) represents the gain coefficient of the pixel, w(x,y) represents an adjustment factor of the pixel, I(x,y) represents a pixel value of the pixel, $l_i$ represents an edge of an $i^{th}$ histogram interval, and $h_i$ represents a value of the $i^{th}$ histogram interval of the weighted histogram.

8. The method according to claim 1, wherein the obtaining a second contrast of a tone mapped binocular image obtained by performing tone mapping on the binocular image based on the first tone mapping curve comprises:

performing tone mapping on the binocular image based on the first tone mapping curve, and obtaining the second contrast of the tone mapped binocular image; or
estimating, based on the first tone mapping curve, a contrast loss value, of the binocular image after tone mapping is performed based on the first tone mapping curve, and obtaining the second contrast based on the contrast loss value and the first contrast.

9. A decoding device, comprising:
one or more processors; and
a non-transitory computer-readable storage medium, coupled to the one or more processors and storing a program, which when executed by the one or more processors, causes the decoding device to:
obtain a binocular image, and generate a first tone mapping curve for the binocular image, wherein the binocular image is a high dynamic range (HDR) image;
obtain a first contrast of the binocular image and a disparity map of the binocular image;
obtain a second contrast of a tone mapped binocular image obtained by performing tone mapping on the binocular image based on the first tone mapping curve; and
obtain a second tone mapping curve based on the first contrast, the second contrast, and the disparity map.

10. The decoding device of claim 9, wherein the program, when executed by the one or more processors, further configures the decoding device to:
determine a disparity gradient of a first pixel in the binocular image based on the disparity map;
obtain a gain coefficient of the first pixel based on a first contrast of the first pixel, a second contrast of the first pixel, and the disparity gradient of the first pixel, wherein the gain coefficient is used to compensate for a reduced contrast of the first pixel caused by tone mapping; and
obtain the second tone mapping curve based on a determined gain coefficient of each pixel in the binocular image.

11. The decoding device of claim 10, wherein the gain coefficient is determined based on following formula:

$$Q(x, y) = \min\left(\frac{K^{-1}(D'(x, y))}{C_{tm}(x, y)}, \frac{C(x, y)}{C_{tm}(x, y)}\right),$$

wherein
Q(x,y) represents a gain coefficient of a pixel, x represents a horizontal coordinate of the pixel, y represents a vertical coordinate of the pixel, D'(x,y) represents a disparity gradient of the pixel, $K^{-1}$( ) represents an inverse function of a function describing a relationship between disparity perception sensitivity and a contrast, C(x,y) represents a first contrast of the pixel, and $C_{tm}$(x,y) represents a second contrast of the pixel.

12. The decoding device of claim 11, wherein the function describing a relationship between disparity perception sensitivity and contrast meets the following condition:

$$K(c) = J\frac{3.34c}{c - 1.77},$$

wherein c represents the contrast, K(c) represents the disparity perception sensitivity, and J represents a fitting coefficient.

13. The decoding device of claim 10, wherein the program, when executed by the one or more processors, further configures the decoding device to:
obtain a weighted histogram based on pixel values of pixels comprised in the binocular image, using a gain coefficient as a weight; and
generate the second tone mapping curve based on the weighted histogram.

14. The decoding device of claim 10, wherein the program, when executed by the one or more processors, further configures the decoding device to:
obtain a weighted histogram based on pixel values of pixels comprised in the binocular image, using a gain coefficient as a weight;
generate a third tone mapping curve based on the weighted histogram; and
perform weighting processing on the first tone mapping curve and the third tone mapping curve to obtain the second tone mapping curve.

15. The decoding device of claim 9, wherein the program, when executed by the one or more processors, further configures the decoding device to:
perform tone mapping on the binocular image based on the first tone mapping curve, and obtaining the second contrast of the tone mapped binocular image; or
estimate, based on the first tone mapping curve, a contrast loss value, of the binocular image after tone mapping is performed based on the first tone mapping curve, and obtain the second contrast based on the contrast loss value and the first contrast.

16. A non-transitory computer-readable storage medium, comprising program code, which when executed by a computer device, causes the computer device to perform operations, the operations comprising:
obtaining a binocular image, and generating a first tone mapping curve for the binocular image, wherein the binocular image is a high dynamic range (HDR) image;
obtaining a first contrast of the binocular image and a disparity map of the binocular image;
obtaining a second contrast of a tone mapped binocular image obtained by performing tone mapping on the binocular image based on the first tone mapping curve; and
obtaining a second tone mapping curve based on the first contrast, the second contrast, and the disparity map, wherein
the second tone mapping curve is used to enable a contrast of the tone mapped binocular image to meet a minimum disparity variation requirement for 3D perception by human eyes.

17. The computer-readable storage medium according to claim 16, wherein the operations further comprise:
determining a disparity gradient of a first pixel based on the disparity map, wherein the first pixel is any pixel in the binocular image;
obtaining a gain coefficient of the first pixel based on a first contrast of the first pixel, a second contrast of the first pixel, and the disparity gradient of the first pixel, wherein the gain coefficient is used to compensate for a reduced contrast of the first pixel caused by tone mapping; and
obtaining the second tone mapping curve based on a determined gain coefficient of each pixel in the binocular image.

18. The computer-readable storage medium according to claim 17, wherein the gain coefficient is determined based on following formula:

$$Q(x, y) = \min\left(\frac{K^{-1}(D'(x, y))}{C_{tm}(x, y)}, \frac{C(x, y)}{C_{tm}(x, y)}\right),$$

wherein
Q(x,y) represents a gain coefficient of a pixel, x represents a horizontal coordinate of the pixel, y represents a vertical coordinate of the pixel, D'(x,y) represents a disparity gradient of the pixel, $K^{-1}$( ) represents an inverse function of a function describing a relationship between disparity perception sensitivity and a contrast, C(x,y) represents a first contrast of the pixel, and $C_{tm}$(x,y) represents a second contrast of the pixel.

19. The computer-readable storage medium according to claim 18, wherein the function describing a relationship between disparity perception sensitivity and contrast meets the following condition:

$$K(c) = J\frac{3.34c}{c - 1.77},$$

wherein
c represents the contrast, K(c) represents the disparity perception sensitivity, and J represents a fitting coefficient.

20. The computer-readable storage medium according to claim 17, wherein the operations further comprise:
obtaining a weighted histogram based on pixel values of pixels comprised in the binocular image, using a gain coefficient as a weight; and
generating the second tone mapping curve based on the weighted histogram.

* * * * *